United States Patent
Jeong et al.

(10) Patent No.: US 11,450,966 B2
(45) Date of Patent: Sep. 20, 2022

(54) ELECTRONIC DEVICE INCLUDING ANTENNA STRUCTURE

(71) Applicant: Samsung Electronics Co., Ltd., Suwon-si (KR)

(72) Inventors: Myunghun Jeong, Suwon-si (KR); Sehyun Park, Suwon-si (KR); Sumin Yun, Suwon-si (KR); Jehun Jong, Suwon-si (KR); Jaehoon Jo, Suwon-si (KR); Jinwoo Jung, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 17/269,798

(22) PCT Filed: Aug. 29, 2019

(86) PCT No.: PCT/KR2019/011034
§ 371 (c)(1),
(2) Date: Feb. 19, 2021

(87) PCT Pub. No.: WO2020/046000
PCT Pub. Date: Mar. 5, 2020

(65) Prior Publication Data
US 2021/0320419 A1    Oct. 14, 2021

(30) Foreign Application Priority Data

Aug. 30, 2018    (KR) .................. 10-2018-0102809

(51) Int. Cl.
*H01Q 11/08*    (2006.01)
*H01Q 5/357*    (2015.01)
*H01Q 3/34*    (2006.01)

(52) U.S. Cl.
CPC ............... *H01Q 11/08* (2013.01); *H01Q 3/34* (2013.01); *H01Q 5/357* (2015.01)

(58) Field of Classification Search
CPC .......... H01Q 3/34; H01Q 5/357; H01Q 11/08
See application file for complete search history.

(56) References Cited

U.S. PATENT DOCUMENTS

2003/0169210 A1    9/2003  Barts et al.
2003/0218571 A1    11/2003 Yoon et al.
(Continued)

FOREIGN PATENT DOCUMENTS

CN    104882667 A    9/2015
JP    2001-292024 A   10/2001
(Continued)

OTHER PUBLICATIONS

60-GHz LTCC Integrated Circularly Polarized Helical Antenna Array; IEEE Transactions on Antennas and Propagation, vol. 60, No. 3, Mar. 2012.
(Continued)

*Primary Examiner* — Graham P Smith
(74) *Attorney, Agent, or Firm* — Jefferson IP Law, LLP

(57) ABSTRACT

According to various embodiments, an electronic device may include a housing, an antenna structure disposed inside the housing and including a first face, a second face facing away from the first face, a first conductive helical pattern which extends between the first face and the second face and is constructed inside the antenna structure, and a second conductive helical pattern which extends between the first face and the second face, overlaps with at least in part with the first conductive helical pattern when viewed from above the first face, and is constructed inside the antenna structure, and at least one wireless communication circuit electrically coupled to a first point of the first conductive helical pattern (Continued)

and a second point of the second conductive helical pattern. The first point may be disposed to be spaced apart from the second point when viewed from above the first face. The at least one wireless communication circuit may be configured to provide the first point with a first signal having a frequency between 3 GHz and 100 GHz, and provide the second point with a second signal having a first phase difference with the first signal and having the frequency. Various other embodiments may also be possible.

15 Claims, 21 Drawing Sheets

(56) References Cited

U.S. PATENT DOCUMENTS

| | | | |
|---|---|---|---|
| 2008/0136734 | A1 | 6/2008 | Manholm et al. |
| 2016/0254842 | A1 | 9/2016 | Hong et al. |
| 2017/0047638 | A1 | 2/2017 | Kim et al. |
| 2017/0366208 | A1 | 12/2017 | Filipovic et al. |
| 2018/0062250 | A1 | 3/2018 | Lavin et al. |

FOREIGN PATENT DOCUMENTS

| | | | |
|---|---|---|---|
| JP | 2008-526098 | A | 7/2008 |
| KR | 10-2004-0003802 | A | 1/2004 |
| KR | 10526585 | B1 | 11/2005 |
| KR | 10589699 | B1 | 6/2006 |
| KR | 0641636 | B1 | 11/2006 |
| KR | 100649703 | B1 | 11/2006 |
| KR | 10-2010-0066265 | A | 6/2010 |
| KR | 10-2015-0080926 | A | 7/2015 |
| KR | 10-2017-0020004 | A | 2/2017 |
| KR | 10-2018-0031120 | A | 3/2018 |

OTHER PUBLICATIONS

Korean Office Action dated Jul. 4, 2022, issued in a counterpart Korean Application No. 10-2018-0102809.

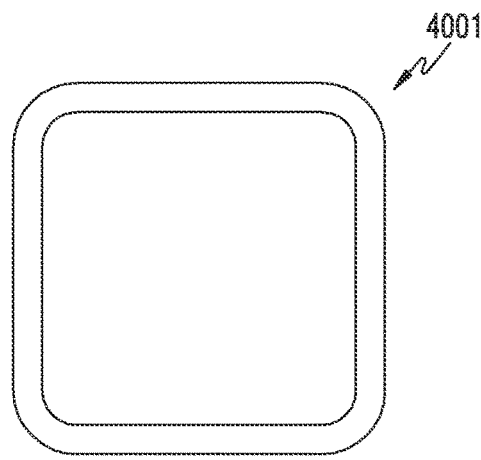
(A)
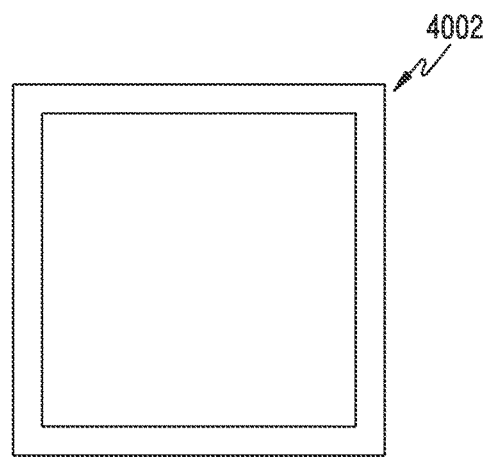
(B)
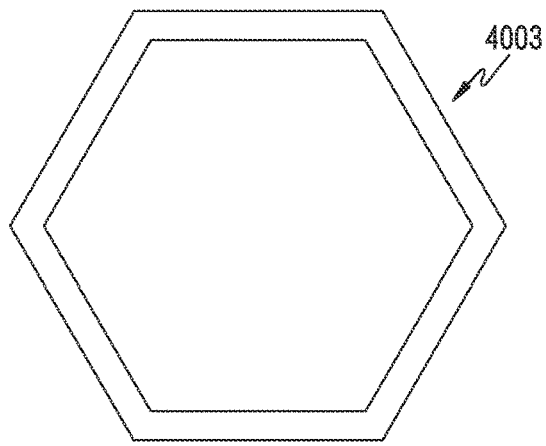
(C)
FIG.10

ELECTRONIC DEVICE INCLUDING ANTENNA STRUCTURE

TECHNICAL FIELD

Various embodiments of the disclosure relate to an electronic device including an antenna structure.

BACKGROUND ART

With the development of wireless communication technologies, electronic devices (e.g., communication electronic devices) are widely used in everyday life, and thus the use of content increases exponentially. Due to the rapid increase in the use of the content, network capacity is gradually reaching a limit. To meet a demand on wireless data traffic which has been in an increasing trend after a $4^{th}$ Generation (4G) communication system was commercialized, there is ongoing research on a communication system (e.g., a $5^{th}$ Generation (5G) or pre-5G communication system, or a new radio (NR)) for transmitting and/or receiving a signal at a frequency of an ultra-high frequency (e.g., mmWave) band (e.g., 3 to 300 GHz bands).

DISCLOSURE OF INVENTION

Technical Problem

Next-generation wireless communication technologies may have a frequency between 3 GHz and 100 GHz substantially, and may use an array structure in which a plurality of antenna elements are arranged with a specific interval in order to overcome a high free space loss due to frequency characteristics and to increase an antenna gain. The antenna array may be constructed such that a plurality of conductive patterns used as a radiator are disposed on a substrate with a specific interval. However, since a trend in which electronic devices using antennas gradually become small in size results in a narrow space of mounting the antenna, it is necessary to decrease an antenna size.

According to various embodiments, an electronic device including an antenna structure including at least one helical antenna may be provided.

Solution to Problem

According to various embodiments, an electronic device may include a housing, an antenna structure disposed inside the housing and including a first face, a second face facing away from the first face, a first conductive helical pattern which extends between the first face and the second face and is constructed inside the antenna structure, and a second conductive helical pattern which extends between the first face and the second face, overlaps with at least in part with the first conductive helical pattern when viewed from above the first face, and is constructed inside the antenna structure, and at least one wireless communication circuit electrically coupled to a first point of the first conductive helical pattern and a second point of the second conductive helical pattern. The first point may be disposed to be spaced apart from the second point when viewed from above the first face. The at least one wireless communication circuit may be configured to provide the first point with a first signal having a frequency between 3 GHz and 100 GHz, and provide the second point with a second signal having a first phase difference with the first signal and having the frequency.

According to various embodiments, an electronic device may include a housing, and an antenna structure disposed inside the housing and including a first antenna element, a second antenna element, a third antenna element, and a fourth antenna element which are disposed helically, an antenna structure including an insulation material disposed between the first, second, third and fourth elements, and a wireless communication circuit electrically coupled to the first, second, third, and fourth antenna element and configured to transmit and/or receive a signal of 3 GHz to 100 GHz having different phases with respect to the first, second, third, and fourth antenna elements. The wireless communication circuit may be configured such that respective signals which are input to the first antenna element and the third antenna element have a first phase difference, and respective signals which are input to the second antenna element and the fourth antenna element have a second phase difference.

Advantageous Effects of Invention

According to various embodiments, an electronic device can use a single antenna structure supporting dual polarization to make an antenna device small in size and/or to improve an isolation of the antenna device.

BRIEF DESCRIPTION OF DRAWINGS

FIG. 10 is a top view of a helical antenna according to various embodiments;

BEST MODE FOR CARRYING OUT THE INVENTION

Figure 1:
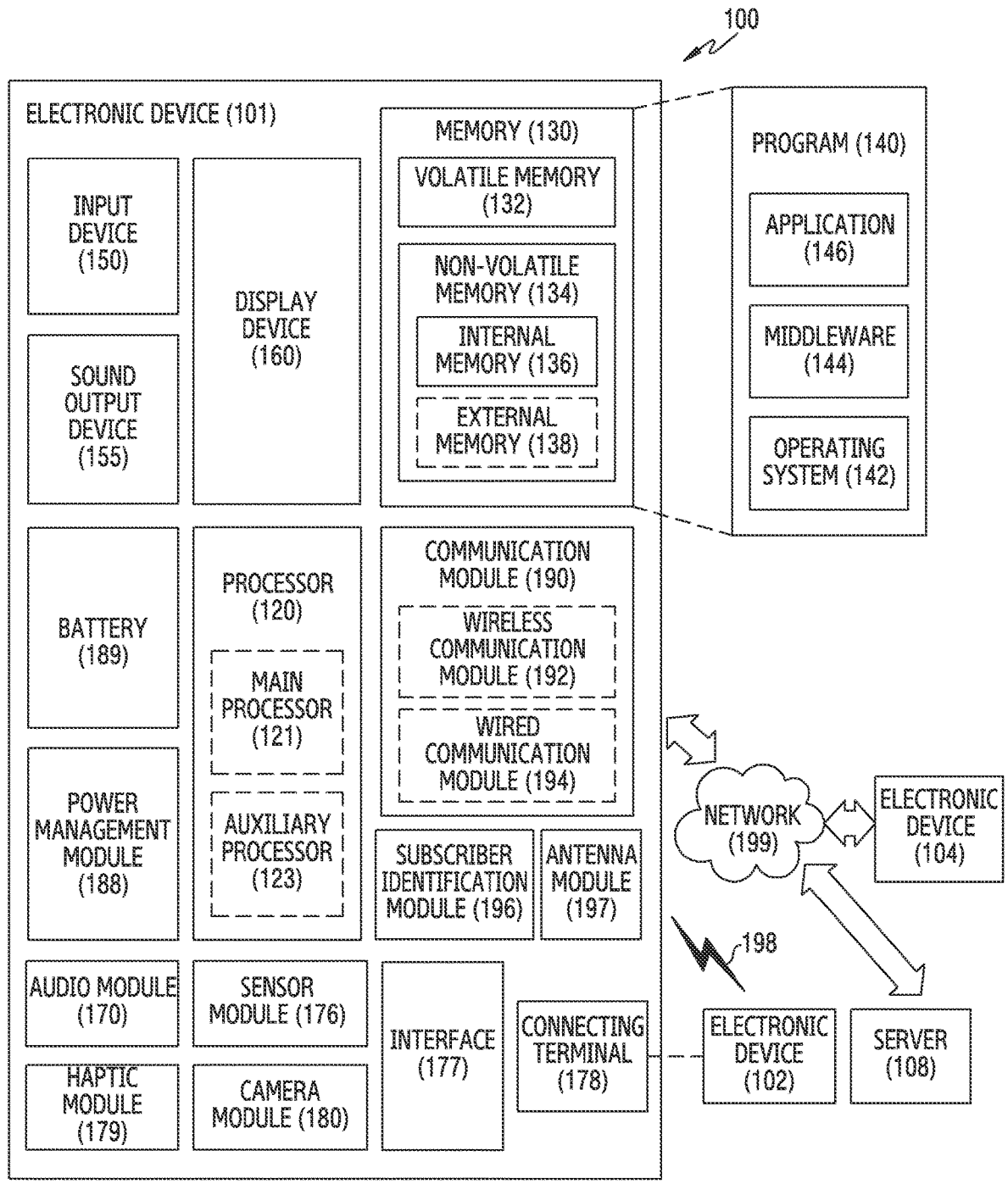
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
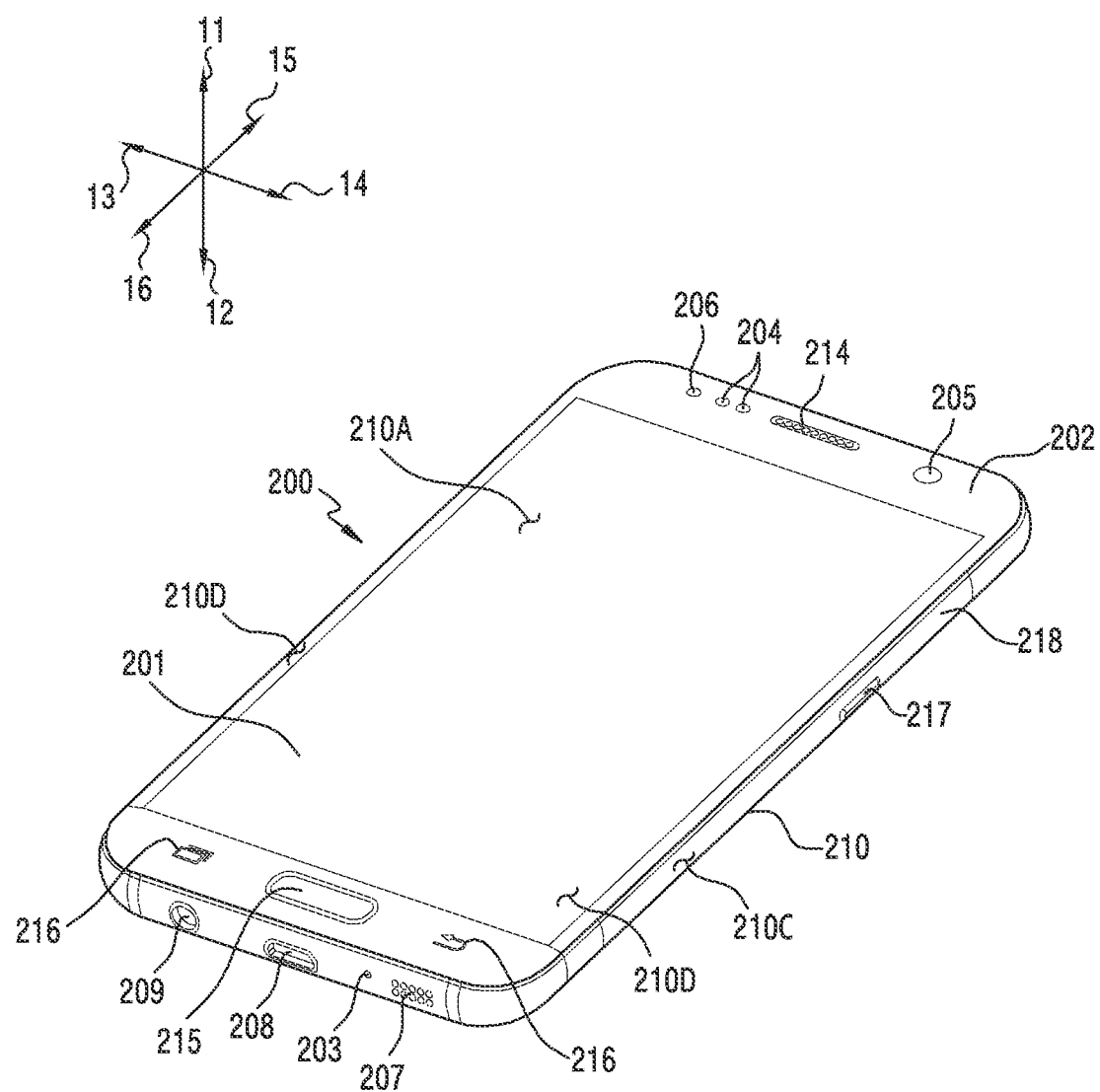
FIG. 2A is a perspective view of a mobile electronic device according to various embodiments of the disclosure.
Figure 2B:
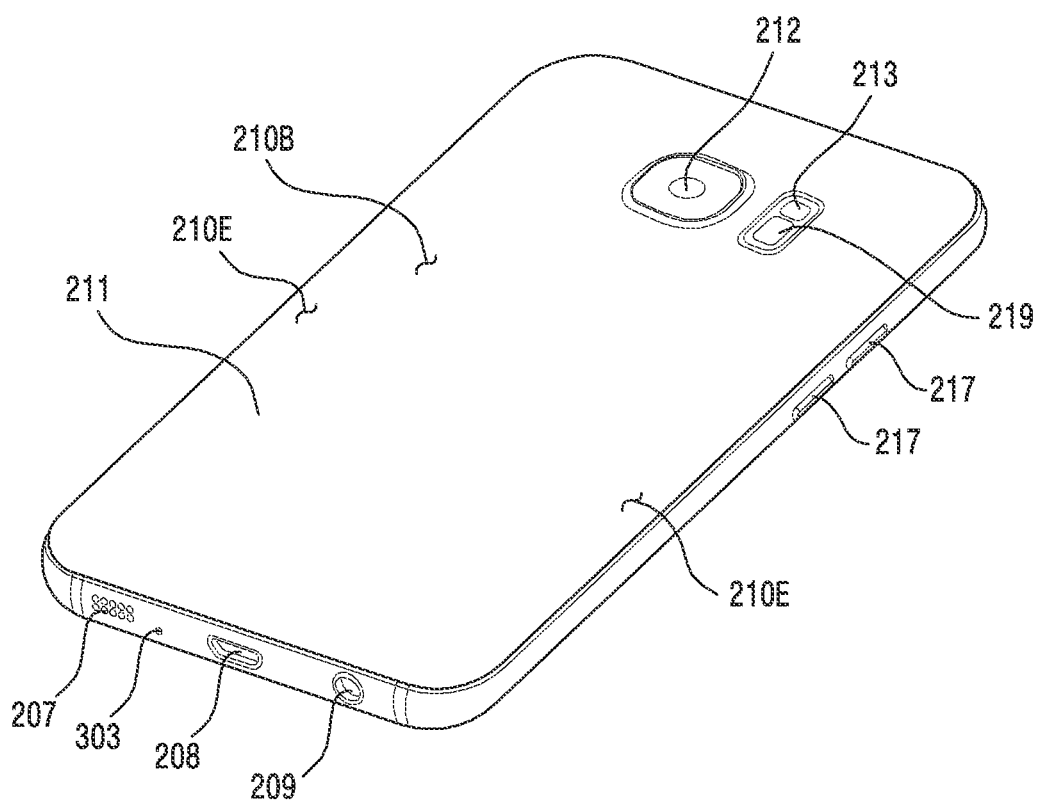
FIG. 2B is a rear perspective view of the electronic device of FIG. 2A according to various embodiments of the disclosure.

FIG. 2A is a perspective view of a mobile electronic device according to various embodiments of the disclosure. FIG. 2B is a rear perspective view of the electronic device of FIG. 2A according to various embodiments of the disclosure.

Referring to FIG. 2A and FIG. 2B, an electronic device 200 according to an embodiment may include a housing 210 including a first face (or a front face) 210A, a second face (or a back face) 210B, and a side face 210C surrounding a space between the first face 210A and the second face 210B. In another embodiment (not shown), the housing may refer to a structure which constitutes part of the first face 210A, second face 210B, and third face 210C of FIG. 2A. According to an embodiment, the first face 210A may be constructed of a front plate 202 (e.g., a polymer plate or a glass plate having various coating layers) which is at least partially transparent substantially. The second face 210B may be constructed of a back plate 211 which is opaque substantially. For example, the back plate 211 may be constructed of coated or colored glass, ceramic, polymer, metallic materials (e.g. aluminum, stainless steel (STS), or magnesium) or a combination of at least two of the these materials. The side face 210C may be constructed of a side bezel structure (or a side member) 218 joined with the front plate 202 and the back plate 211 and including metal and/or polymer. In some embodiments, the back plate 211 and the side bezel structure 218 may be constructed integrally and may include the same material (e.g., a metallic material such as aluminum).

In the illustrated embodiment, the front plate 202 may include two first regions 210D seamlessly extending by being bent from the first face 210A toward the back plate 211 at both ends of a long edge of the front plate. In the illustrated embodiment (see FIG. 2A), the back plate 211 may include a second region 210E seamlessly extending by being bent from the second face 210B toward the front plate at both ends of a long edge. In some embodiments, the front plate or the back plate may include only one of the first region and the second region. In the above embodiments, when viewed from a side face of the electronic device, the side bezel structure may have a first thickness (or width) in a side face in which the first region or the second region is not included, and may have a second thickness thinner than the first thickness in a side face in which the first region or the second region is included.

According to an embodiment, the electronic device 200 may include at least one or more of a display 201, audio modules 203, 207, and 214, sensor modules 204 and 219, camera modules 205, 212, and 213, key input devices 215, 216, and 217, an indicator 206, and connector holes 208 and 209. In some embodiments, the electronic device 200 may omit at least one of components (e.g., the key input devices 215, 216, and 217 or the indicator 206), or other components may be additionally included.

The display 201 may be exposed through, for example, some portions of the front plate 202. In some embodiments, at least part of the display 201 may be exposed through the first face 210A and the front plate 202 constructing the first regions 210E of the side face 210C. The display 201 may be disposed adjacent to or joined with a touch sensing circuit, a pressure sensor capable of measuring touch strength (pressure), and/or a digitizer for detecting a magnetic-type stylus pen. In some embodiments, at least part of the sensor modules 204 and 219 and/or at least part of the key input devices 215, 216, and 217 may be disposed to the first regions 210D and/or the second regions 210E.

The audio modules 203, 207, and 214 may include the microphone hole 203 or the speaker holes 207 and 214. A microphone for acquiring external sound may be disposed inside the microphone hole 203. In some embodiments, a plurality of microphones may be disposed to detect a direction of the sound. The speaker holes 207 and 214 may include the external speaker hole 207 and the receiver hole 214 for a call. In some embodiments, the speaker holes 207 and 214 and the microphone hole 203 may be implemented as one hole, or a speaker (e.g., a Piezo speaker) may be included without the speaker holes 207 and 214.

The sensor modules 204 and 219 may generate an electrical signal or data value corresponding to an internal operational state of the electronic device 200 or an external environmental state. The sensor modules 204 and 219 may include, for example, the first sensor module 204 (e.g., a proximity sensor) and/or second sensor module (not shown) (e.g., a fingerprint sensor) disposed to the first face 210A of the housing 210, and/or the third sensor module 219 (e.g., a Heart Rate Monitoring (HRM) sensor) disposed to the second face 210B of the housing 210. The fingerprint sensor may be disposed not only to the first face 210A (e.g., the home hey button 215) but also to the second face 210B of the housing 210. The electronic device 200 may further include at least one of senor modules (not shown), for example, a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, and an illuminance sensor.

The camera modules 205, 212, and 213 may include the first camera module 205 disposed to the first face 210A of the electronic device 200, the second camera module 212 disposed to the second face 210B, and/or the flash 213. The camera module 205 and 212 may include one or more lenses, an image sensor, and/or an image signal processor. The flash 213 may include, for example, a Light Emitting Diode (LED) or a xenon lamp. In some embodiments, two or more lenses (wide angle and telephoto lenses) and image sensors may be disposed to one face of the electronic device 200.

The key input devices 215, 216, and 217 may include the home key button 215 disposed to the first face 210A of the housing 210, the touch pad 216 disposed around the home key button 215, and/or the side key button 217 disposed to the side face 210C of the housing 210. In another embodiment, the electronic device 200 may not include some or all of the aforementioned key input devices 215, 216, and 217. The key input devices 215, 216, and 217, which are not included, may be implemented on the display 201 in a different form such as a soft key or the like.

The indicator 206 may be disposed, for example, to the first face 210A of the housing 210. The indicator 206 may provide, for example, state information of the electronic device 200 in an optical form, and may include an LED.

The connector holes 208 and 209 may include the first connector hole 208 capable of accommodating a connector (e.g., a USB connector) for transmitting and/or receiving power and/or data of an external electronic device and/or the second connector hole (or earphone jack) 209 capable of accommodating a connector for transmitting and/or receiving an audio signal with respect to the external electronic device.

Figure 2C:
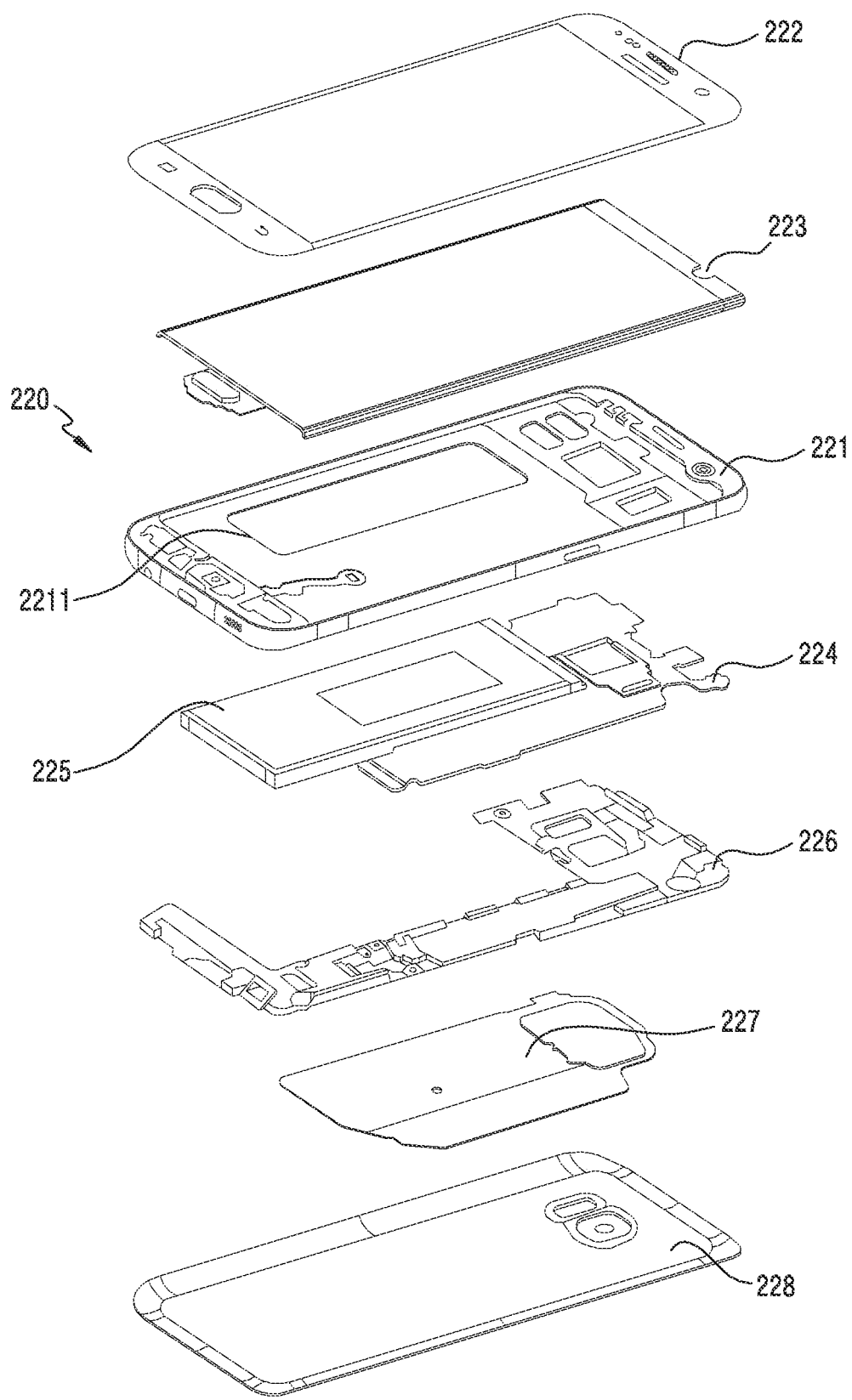
FIG. 2C is an exploded perspective view of an electronic device according to various embodiments of the disclosure.

FIG. 2C is an exploded perspective view of an electronic device according to various embodiments of the disclosure.

An electronic device 220 of FIG. 2C may include a side bezel structure 221, a first support member 2211 (e.g., a bracket), a front plate 222 (e.g., the front plate 202 of FIG. 2A), a display 223, a Printed Circuit Board (PCB) 224, a battery 225, a second support member 226 (e.g., a rear case), an antenna 227, and a back plate 228. In some embodiments, the electronic device 220 may omit at least one (e.g., the first support member 2211 or the second support member 226) of these components, or may additionally include other components. At least one of the components of the electronic device 220 may be the same as or similar to at least one of the components of the electronic device 200 of FIG. 2A or FIG. 2B, and redundant descriptions will be omitted hereinafter.

The first support member 2211 may be coupled with the side bezel structure 221 by being disposed inside the electronic device 220, or may be constructed integrally with respect to the side bezel structure 221. The first support member 2211 may be constructed of, for example, a metal material and/or non-metal material (e.g., polymer). The display 223 may be bonded to one face of the first support member 2211, and the PCB 224 may be bonded to the other face thereof. A processor, a memory, and/or an interface may be mounted on the PCB 224. The processor may include, for example, one or more of a central processing unit, an application processor, a graphic processing unit, an image signal processor, a sensor hub processor, and a communication processor.

The memory may include, for example, a volatile memory or a non-volatile memory.

The interface may include, for example, a High Definition Multimedia Interface (HDMI), a Universal Serial Bus (USB) interface, a Secure Digital (SD) card interface, and/or an audio interface. For example, the interface may electrically or physically couple the electronic device 220 and the external electronic device, and may include a USB connector, an SD card/MMC connector, or an audio connector.

As a device for supplying power to at least one component of the electronic device 220, the battery 225 may include, for example, a non-rechargeable primary cell, a rechargeable secondary cell, or a fuel cell. At least a part of the battery 225 may be disposed on the same plane substantially with respect to, for example, the PCB 224. The battery 225 may be disposed integrally inside the electronic device 220, or may be detachably disposed with respect to the electronic device 220.

The antenna 227 may be disposed between the back plate 228 and the battery 225. The antenna 227 may include, for example, a Near Field Communication (NFC) antenna, a wireless charging antenna, and/or a Magnetic Secure Transmission (MST) antenna. The antenna 227 may perform short-range communication, for example, with the external electronic device, or may wirelessly transmit and/or receive power required for charging. In another embodiment, an antenna structure may be constructed by at least a part of the side bezel structure 221 and/or the first support member 2211 or a combination thereof.

Figure 3A:
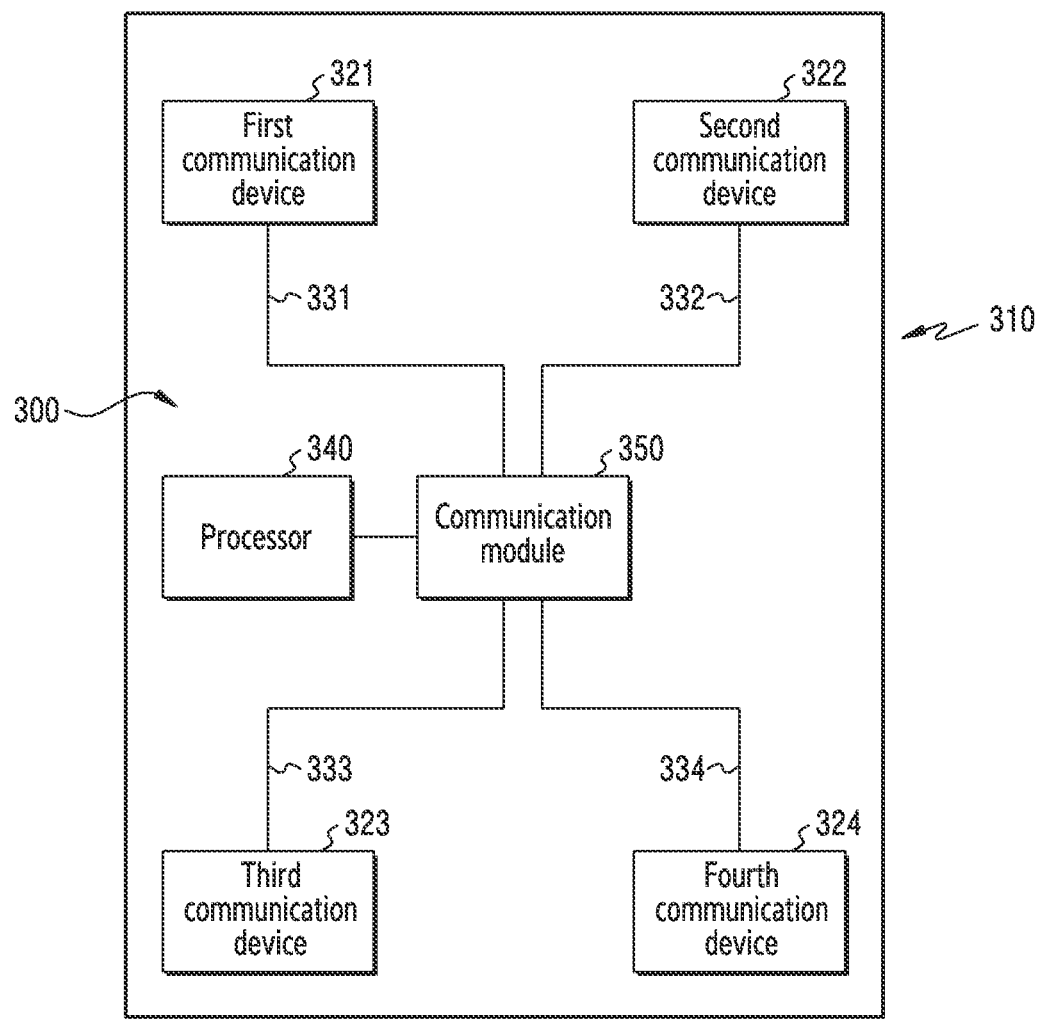
FIG. 3A illustrates an example of an electronic device supporting $5^{th}$ Generation (5G) communication.

FIG. 3A illustrates an example of an electronic device supporting 5G communication.

Referring to FIG. 3A, an electronic device 300 may include at least one of a housing 310, a processor 340, a communication module 350 (e.g., the communication module 190 of FIG. 1), a first communication device 321, a second communication device 322, a third communication device 323, a fourth communication device 324, a first conductive line 331, a second conductive line 332, a third conductive line 333, and a fourth conductive line 334.

According to an embodiment, the housing 310 may protect other components of the electronic device 300. The housing 310 may include, for example, a front plate, a back plate facing away from the front plate, and a side member (or a metal frame) attached to the back plate or constructed integrally with the back plate and surrounding a space between the front plate and the back plate.

According to an embodiment, the electronic device 300 may include the first communication device 321, the second communication device 322, the third communication device 323, or the fourth communication device 324.

According to an embodiment, the first communication device 321, the second communication device 322, the third communication device 323, or the fourth communication device 324 may be located inside the housing 310. According to an embodiment, when viewed from above the back plate of the electronic device, the first communication device 321 may be disposed to a left upper end of the electronic device 300, the second communication device 322 may be disposed to a right upper end of the electronic device 300, the third communication device 323 may be disposed to a left lower end of the electronic device 300, and the fourth communication device 324 may be disposed to a right lower end of the electronic device 300.

According to an embodiment, the processor 340 may include one or more of a central processing unit, an application processor, a Graphic Processing Unit (GPU), an image signal processor of a camera, and a baseband processor (or a Communication Processor (CP)). According to an embodiment, the processor 340 may be implemented as a System on Chip (SoC) or a System in Package (SIP).

According to an embodiment, the communication module 350 may be electrically coupled with the first communication device 321, the second communication device 322, the third communication device 323, or the fourth communication device 324 by using the first conductive line 331, the second conductive line 332, the third conductive line 333, or the fourth conductive line 334. The communication unit 350 may include, for example, a baseband processor or at least one communication circuit (e.g., IFIC or RFIC). The communication module 350 may include, for example, a baseband processor separate from the processor 340 (e.g., an Application Processor (AP)). The first conductive line 331, the second conductive line 332, the third conductive line, or the fourth conductive line 334 may include, for example, a coaxial cable or an FPCB.

According to an embodiment, the communication module 350 may include a first Baseband Processor (BP) (not shown) or a second BP (not shown). The electronic device 300 may further include one or more interfaces between the first BP (or the second BP) and the processor 340 to support communication between chips. The processor 340 and the first BP or the second BP may transmit or receive data by using the interface between the chips (i.e., an inter-processor communication channel).

According to an embodiment, the first BP or the second BP may provide an interface for performing communication with different entities. The first BP may support wireless communication, for example, for a first network (not shown). The second BP may support wireless communication, for example, for a second network (not shown).

According to an embodiment, the first BP or the second BP may form one module together with the processor 340. For example, the first BP or the second BP may be integrally formed together with the processor 340. For another example, the first BP or the second BP may be disposed inside one chip, or may be formed as an independent chip. According to an embodiment, the processor 340 and at least one BP (e.g. the first BP) may be integrally formed inside one chip (SoC chip), and another BP (e.g., the second BP) may be formed as an independent chip.

According to an embodiment, the first network (not shown) or the second network (not shown) may correspond to the network 199 of FIG. 1. According to an embodiment, each of the first network (not shown) and the second network (not shown) may include a 4th Generation (4G) network and a 5G network. The 4G network may support, for example, a Long Term Evolution (LTE) protocol defined in 3GPP. The 5G network may support, for example, a New Radio (NR) protocol defined in 3GPP.

Figure 3B:
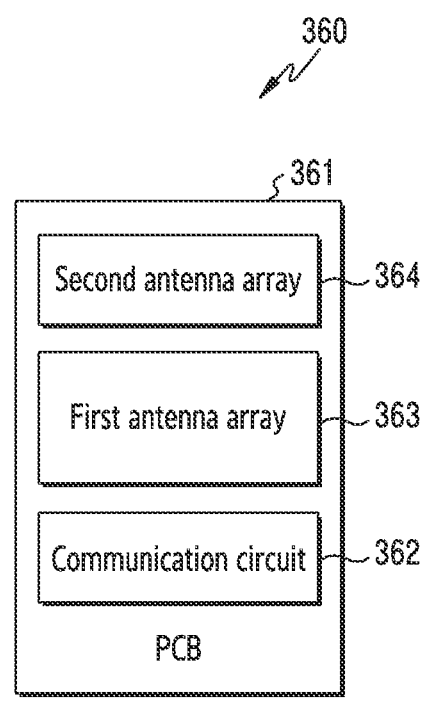
FIG. 3B is a block diagram of a communication device according to an embodiment.

FIG. 3B is a block diagram of a communication device according to an embodiment.

Referring to FIG. 3B, the communication device 360 (e.g., the first communication device 321, second communication device 322, third communication device 323, and fourth communication device 324 of FIG. 3A) may include a communication circuit 362 (e.g., RFIC), a PCB 361, a first antenna array 363, or a second antenna array 364.

According to an embodiment, the communication circuit 362, the first antenna array 363, or the second antenna array 364 may be located in the PCB 361. For example, the first antenna array 363 or the second antenna array 364 may be disposed to a first face of the PCB 361, and the communication circuit 362 may be disposed to a second face of the PCB 361. The PCB 361 may include a connector (e.g., a coaxial cable connector or a Board to Board (B-to-B) connector) so as to be electrically coupled with another PCB (e.g., a PCB on which the communication module 350 of FIG. 3A is disposed) by using a transmission line (e.g., the first conductive line 331 of FIG. 3A, a coaxial cable). The PCB 361 may be coupled with a PCB having the communication module 350 disposed thereon through a coaxial cable by using, for example, the coaxial cable connector, and the coaxial cable may be used to transfer transmission and reception IF signals or RF signals. For another example, power or other control signals may be transferred through the B-to-B connector.

According to an embodiment, the first antenna array 363 and/or the second antenna array 364 may include a plurality of antenna elements. The antenna elements may include a patch antenna, a loop antenna, a dipole antenna, and/or a helical antenna. For example, the antenna element included in the first antenna array 363 may be a patch antenna and/or helical antenna for forming a beam towards the back plate of the electronic device 300. For another example, the antenna element included in the second antenna array 364 may be a dipole antenna and/or loop antenna for forming a beam towards the side member of the electronic device (e.g., the electronic device 200 of FIG. 2A).

According to an embodiment, the communication circuit 362 may support at least part (e.g., 24 GHz to 30 GHz or 37 GHz to 40 GHz) of a band between 3 GHz and 100 GHz. According to an embodiment, the communication circuit 362 may up-convert or down-convert frequencies. For example, the communication circuit 362 included in the communication device 360 (e.g., the first communication device 321 of FIG. 3A) may up-convert an IF signal received through a conductive line (e.g., the first conductive line 331 of FIG. 3A) from the communication module (e.g., the communication module 350 of FIG. 3A) into an RF signal. For another example, the communication circuit 362 included in the communication device 360 (e.g., the first communication device 321 of FIG. 3A) may down-convert an RF signal (e.g., a millimeter wave signal) received through the first antenna array 363 or the second antenna array 364 into an IF signal, and may transmit the signal to the communication module by using the conductive line.

Figure 4A:
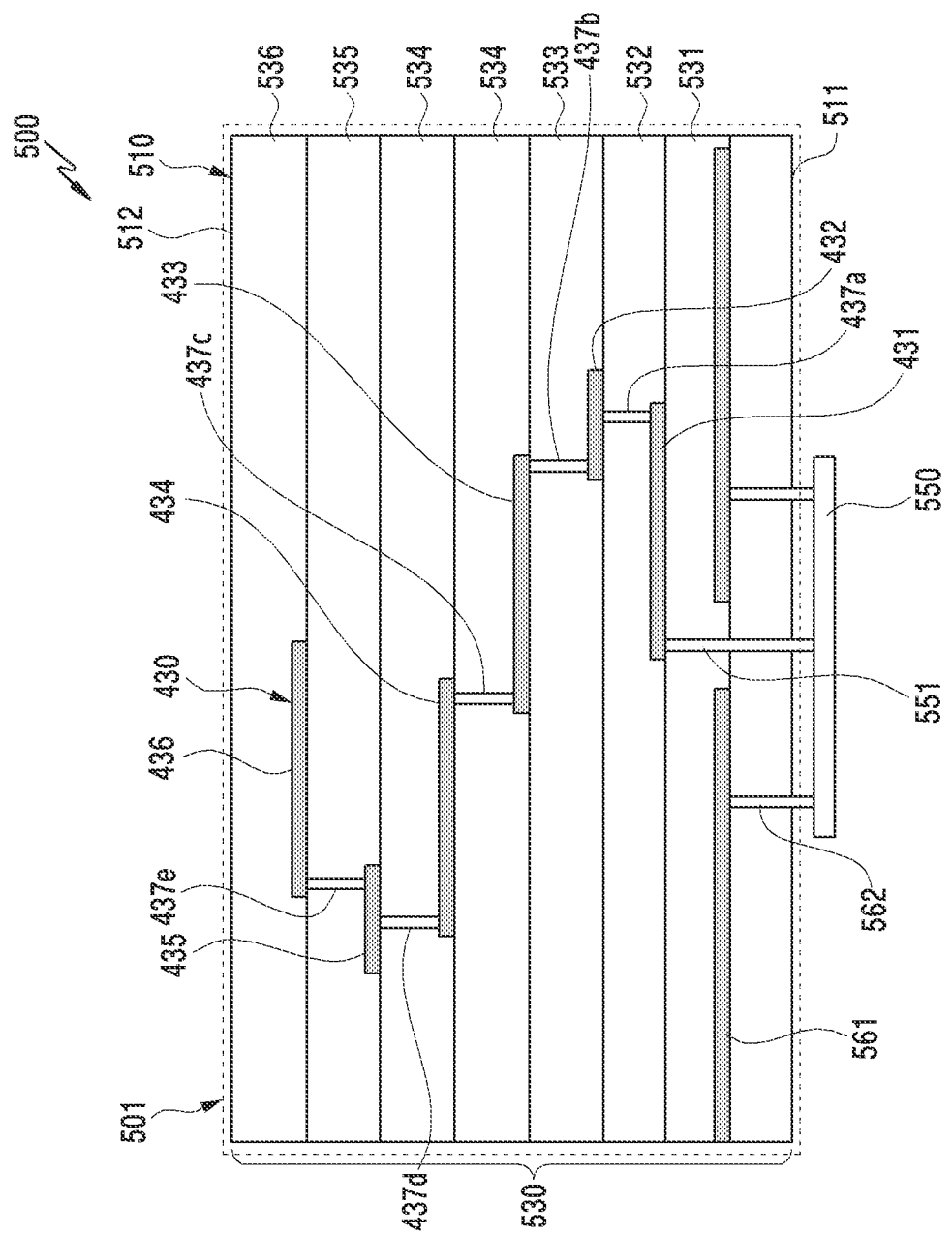
FIG. 4A is a cross-sectional view illustrating a stacked structure of a communication device according to various embodiments.
Figure 4B:
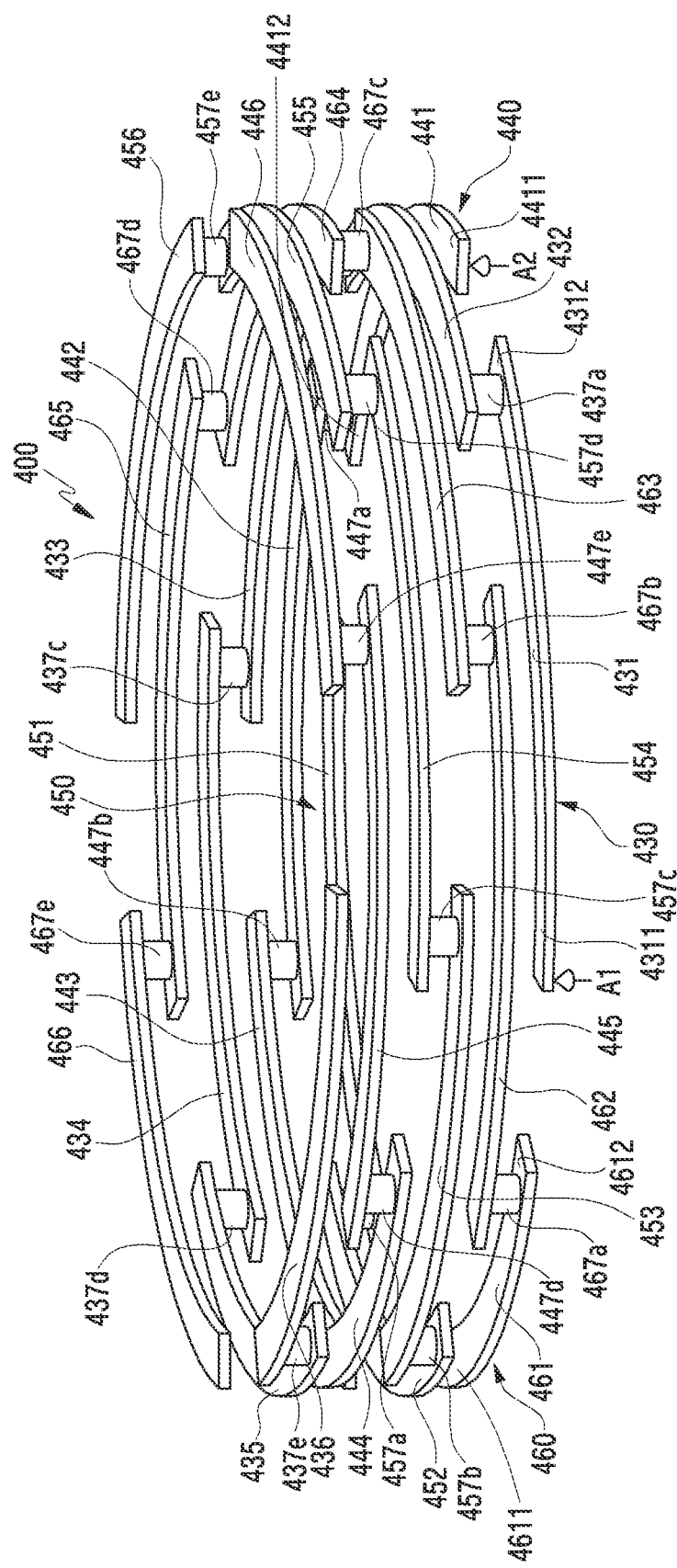
FIG. 4B is a perspective view illustrating a structure of disposing a helical antenna of the communication device of FIG. 4A according to various embodiments.
Figure 4C:
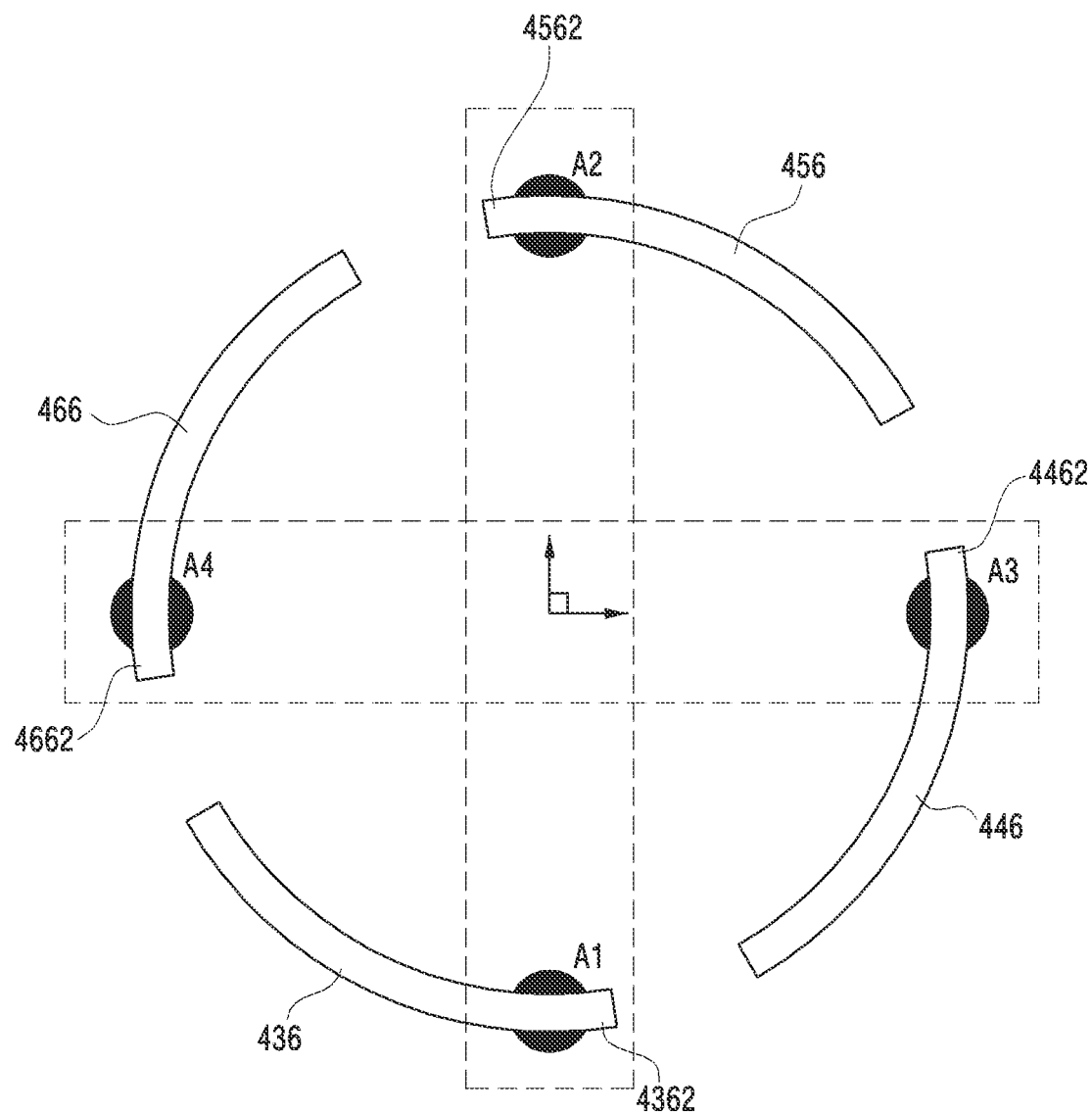
FIG. 4C is a top view of the helical antenna of FIG. 4B according to various embodiments.
Figure 4D:
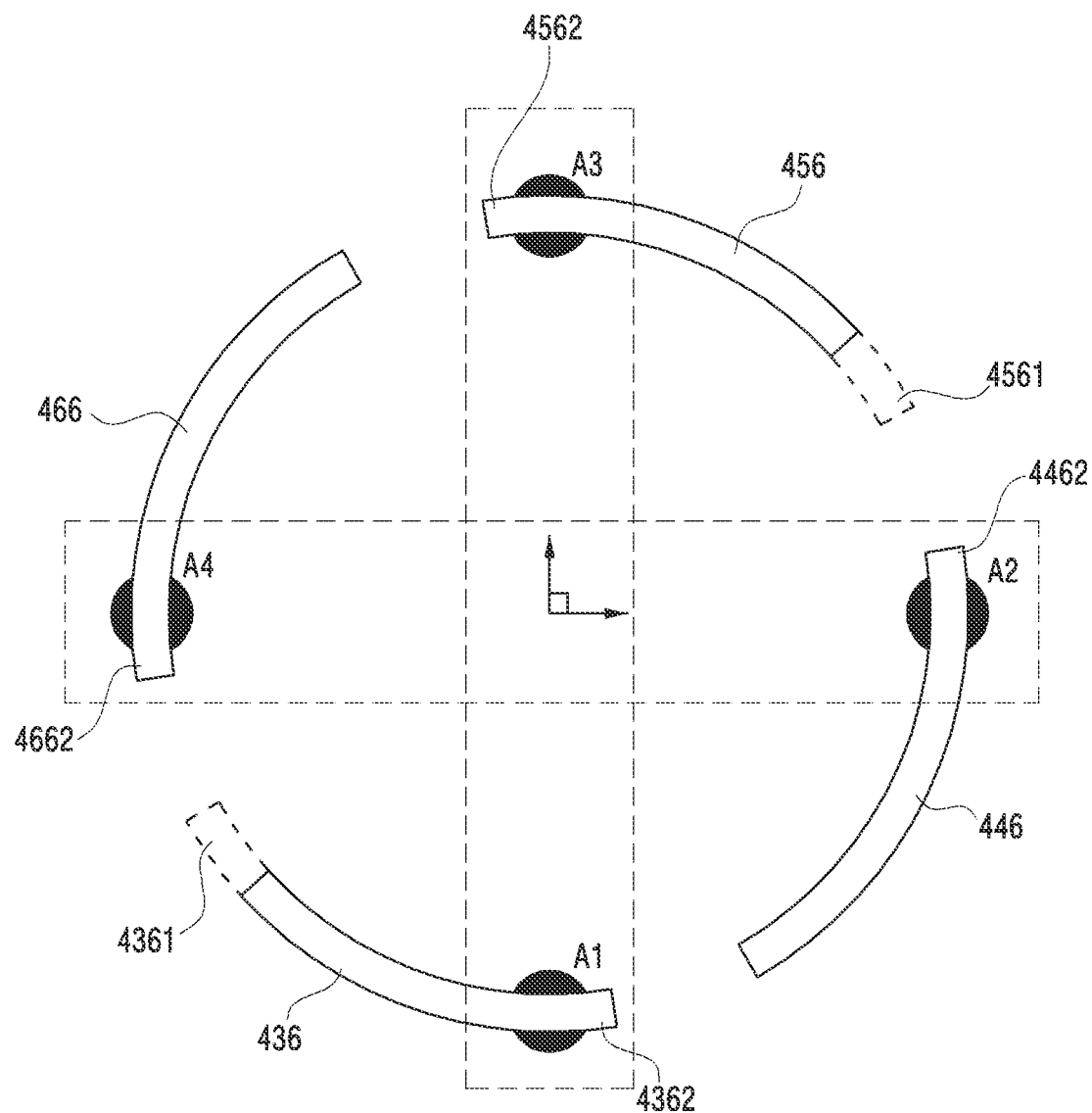
FIG. 4D is a top view of a helical antenna according to another embodiment, different from the helical antenna of FIG. 4B according to various embodiments.

FIG. 4A is a side transparent view illustrating a stacked structure of one antenna element (e.g., a first antenna element 430) of a helical antenna 400 of a communication device according to various embodiments. FIG. 4B is a perspective view illustrating a structure of disposing the helical antenna of the communication device of FIG. 4A according to various embodiments. FIG. 4C is a top view of the helical antenna of FIG. 4B according to various embodiments. FIG. 4D is a top view of the helical antenna according to another embodiment. Hereinafter, the antenna element constituting the helical antenna 400 may be used interchangeably with a "conductive helical pattern".

The communication device of FIG. 4A may be at least in part similar to the communication devices 310, 320, 330, and 340 of FIG. 3, or may include other embodiments of the communication device.

Referring to FIG. 4A and FIG. 4B, a communication device 500 may include an antenna structure 501. According to an embodiment, the antenna structure 501 may include a substrate 510 and the helical antenna 400 disposed to some regions of the substrate 510. According to an embodiment, the helical antenna 400 may be constructed by including a first antenna element 430, a second antenna element 440, a third antenna element 450, and/or a fourth antenna element 460. According to an embodiment, the communication device 500 may include the substrate 510. According to an embodiment, a first face 511 of the substrate 510 and a second face 512 facing away from the first face 511 may be included. According to an embodiment, the substrate 510 may be disposed such that the second face 512 faces a back plate (e.g., the back plate 211 of FIG. 2B) of the electronic device (e.g., the electronic device 200 of FIG. 2B). However, without being limited thereto, the substrate 510 may be disposed such that the second face 512 faces a side member (e.g., the side member 216 of FIG. 2A) or front plate (e.g., the front plate 202 of FIG. 2A) of the electronic device. According to an embodiment, the substrate 510 may include the helical antenna 400 constructed in a shape which penetrates the substrate 510 in a direction perpendicular to the first face 511 and second face 512. According to an embodiment, the helical antenna 400 may include the first antenna element 430, the second antenna element 440, the third antenna element 450, and/or the fourth antenna element 460, which are disposed to be spaced apart from each other with a specific internal along a helical boundary. According to an embodiment, the communication device 500 may include a wireless communication circuit 550 disposed to the first face 511 of the substrate 510. According to an embodiment, the wireless communication circuit 550 may be configured to transmit and/or receive a signal having a frequency between 3 GHz and 100 GHz. According to an embodiment, the substrate 510 may be mounted on a PCB (e.g., the PCB 350 of FIG. 3) of the electronic device (e.g., the electronic device 300 of FIG. 3) in a form of a Ball Grid Array (BGA) package.

According to various embodiments, at least part of the helical antenna 400 may be disposed on a plurality of insulation layers 530 by including the first face 511 and/or second face 512 of the substrate 510. However, without being limited thereto, the helical antenna 400 may also be disposed between the plurality of insulation layers 530 constituting the substrate 510, other than the first face 511 and second face 512 of the substrate 510. According to an embodiment, the helical antenna 400 may use a distance between at least some of the plurality of insulation layers 530, which serves as a thickness of the substrate 510, as an electrical length (e.g., a radiation path). Hereinafter, a direction in which the plurality of insulation layers 530 are stacked may be described as a stacking direction, and the stacking direction may be described as a direction perpendicular to each of the first face 511 and the second face 512.

According to various embodiments, the helical antenna 400 may be constructed by including at least one of the first antenna element 430, the second antenna element 440, the third antenna element 450, and the fourth antenna element 460. At least one (e.g., the first antenna element 430 of FIG. 4B) of the first to fourth antenna elements 430 to 460 constituting the helical antenna 400 may have a shape which penetrates the substrate 510 in the stacking direction (e.g., a direction perpendicular to the first face 511 and second face 512 of the substrate 510). According to various embodiments, at least one (e.g., the first antenna element 430 of FIG. 4B) of the first to fourth antenna elements 430 to 460 may include a plurality of conductive vias (e.g., first to fifth conductive vias 437a, 437b, 437c, 437d, and 437e) which electrically couple the elongated conductive lines with each other by penetrating the plurality of elongated conductive lines (e.g., first to sixth elongated conductive lines 431, 432, 433, 434, 435, and 436) disposed between the plurality of insulation layers 530 and some of the plurality of insulation layers 530 in a thickness direction, and thus may be constructed in an annular shape as a whole when viewed from above the substrate 510.

According to various embodiments, at least one (e.g., the first antenna element 430 of FIG. 4B) of the plurality of antenna elements may include the first elongated conductive line 431 disposed to a first insulation layer 531, the second elongated conductive line 432 disposed to a second insulation layer 532 stacked in parallel to the first insulation layer 531 on the first insulation layer 531, the third elongated conductive line 433 disposed to a third insulation layer 533 stacked in parallel on the second insulation layer 532, the fourth elongated conductive line 434 disposed to a fourth insulation layer 534 stacked in parallel on the third insulation layer 533, the fifth elongated conductive layer 535 disposed to a fifth insulation layer 535 stacked in parallel on the fourth insulation layer 534, and/or the sixth elongated conductive line 436 disposed to a sixth insulation layer 536 stacked in parallel on the fifth insulation layer 535. In this case, the first elongated conductive line 431 may be disposed to overlap with the second elongated conductive line 432 in at least some regions in the stacking direction of the plurality of insulation layers 530. The first elongated conductive line 431 and the second elongated conductive line 432 may be electrically coupled through the first conductive via 437a which penetrates the second insulation layer 532 in the thickness direction. The first conductive via 437a may be disposed to a region in which the first elongated conductive line 431 and the second elongated conductive line 432 overlap. At least part of a region opposed in a circumferential direction to the region in which the second elongated conductive line 432 overlaps with the first elongated conductive line 431 may be disposed to overlap with the third elongated conductive line 433 in the thickness direction of the substrate 510. In this case, the second conductive via 437b which electrically couples the second elongated conductive line 432 and the third elongated conductive line 433 by penetrating the third insulation layer 533 in the stacking direction may be disposed to the overlapping region. At least part of a region opposed in a lengthwise direction to the region in which the third elongated conductive line 433 overlaps with the second elongated conductive line 432 may be disposed to overlap with the fourth elongated conductive line 434 in a direction perpendicular to each of the first face 511 and second face 512 of the substrate 510. In this case, the third conductive via 437c which electrically couples the third elongated conductive line 433 and the fourth elongated conductive line 434 by penetrating the fourth insulation layer 534 in the stacking direction may be disposed to the overlapping region. At least part of a region opposed in the circumferential direction to the region in which the fourth elongated conductive line 434 overlaps with the third elongated conductive line 433 may be disposed to overlap with the fifth elongated conductive line 435 in a direction perpendicular to each of the first face 511 and second face 512 of the substrate 510. The fourth conductive via 437d which electrically couples the fourth elongated conductive line 434 and the fifth elongated conductive line 435 by penetrating the fifth insulation layer 535 in the stacking direction may be disposed to the overlapping region. In addition, at least part of a region opposed in the circumferential direction to the region in which the fifth elongated conductive line 435 overlaps with the fourth elongated conductive line 434 may be disposed to overlap with the sixth elongated conductive line 436 in a direction perpendicular to each of the first face 511 and second face 512 of the substrate 510. In this case, the fifth conductive via 437e which electrically couples the fifth elongated conductive line 435 and the sixth elongated conductive line 436 by penetrating the sixth insulation layer 536 in the stacking direction may be disposed to the overlapping region.

According to various embodiments, the first antenna element 430 may be constructed in a circular shape when viewed from above the substrate 510. In an embodiment, each of the elongated conductive lines of the first antenna element 430 may be constructed such that a rotation angle is approximately 80 degrees about a center of a circle. However, without being limited thereto, it is obvious that there is a change depending on a designer's intention by considering an electrical length of the antenna. According to an embodiment, an operating frequency band and bandwidth may be adjusted depending on an electrical length adjusted based on a length of each of the elongated conductive lines and a length of each of the conductive vias. According to an embodiment, since the helical antenna 400 uses the distance between the plurality of insulation layers 430, which serves as the thickness of the substrate 410, as the electrical length (e.g., the radiation path), radiation performance may be improved. According to an embodiment, the electrical length is utilized two-dimensionally through the conductive via, and thus there is an advantage in that a size is decreased by about 20%, compared to a one-dimensional patch-type antenna which uses the same resonant frequency.

Although the first antenna element 430 is described above for example among the plurality of helical antennas, the second antenna element 440 to the fourth antenna element 460 may include a plurality of conducive vias which electrically couple the elongated conductive lines with each other by penetrating the plurality of elongated conductive lines disposed between the plurality of insulation layers 530 and some of the plurality of insulation layers 530 in the thickness direction, and thus may be also constructed in an annular shape as a whole when viewed from above the substrate 510.

A first elongated conductive line 441 of the second antenna element 440 according to various embodiments may be disposed to overlap with a second elongated conductive line 442 in at least some regions in a direction perpendicular to each of the first face 511 and second face 512 of the substrate 510. In this case, a first conductive via 447a which electrically couples the first elongated conductive line 441 and the second elongated conductive line 442 by penetrating the second insulation layer 532 in the stacking direction may be disposed to the overlapping region. At least part of a region opposed in the lengthwise direction to the region in which the second elongated conductive line 442 overlaps with the first elongated conductive line 441 may be disposed to overlap with a third elongated conductive line 443 in a direction perpendicular to each of the first face 511 and second face 512 of the substrate 510. In this case, a second conductive via 447b which electrically couples the second elongated conductive line 442 and the third elongated conductive line 443 by penetrating the third insulation layer 533 in the stacking direction may be disposed to the overlapping region. At least part of a region opposed in the circumferential direction to the region in which the third elongated conductive line 443 overlaps with the second elongated conductive line 442 may be disposed to overlap with a fourth elongated conductive line 444 in a direction perpendicular to each of the first face 511 and second face 512 of the substrate 510. In this case, a third conductive via 447c which electrically couples the third elongated conductive line 443 and the fourth elongated conductive line 444 by penetrating a fourth insulation layer 544 in the stacking direction may be disposed to the overlapping region. At least part of a region opposed in the circumferential direction to the region in which the fourth elongated conductive line 444 overlaps with the third elongated conductive line 443 may be disposed to overlap with a fifth elongated conductive line 445 in a direction perpendicular to each of the first face 511 and second face 512 of the substrate 510. In this case, a fourth conductive via 447d which electrically couples the fourth elongated conductive line 444 and the fifth elongated conductive line 445 by penetrating the fifth insulation layer 535 in the stacking direction may be disposed to the overlapping region. In addition, at least part of a region opposed in the circumferential direction to the region in which the fifth elongated conductive line 445 overlaps with the fourth elongated conductive line 444 may be disposed to overlap with a sixth elongated conductive line 446 in a direction perpendicular to each of the first face 511 and second face 512 of the substrate 510. In this case, a fifth conductive via 447e which electrically couples the fifth elongated conductive line 445 and the sixth elongated conductive line 446 by penetrating the sixth insulation layer 536 in the stacking direction may be disposed to the overlapping region. In an embodiment, the second antenna element 440 may be constructed in a circular shape when viewed from above the substrate 510. According to an embodiment, each of the elongated conductive lines of the second antenna element 440 may be constructed such that a rotation angle is approximately 80 degrees about a center of a circle, and may be constructed in a circuit shape as a whole by being disposed to be spaced apart by a specific interval from each of the elongated conductive lines of the first helical antenna 430 disposed to the same insulation layer.

A first elongated conductive line 451 of the third antenna element 450 according to various embodiments may be disposed to overlap with a second elongated conductive line 452 in at least some regions in a direction perpendicular to each of the first face 511 and second face 512 of the substrate 510, and a first conductive via 457a which electrically couples the first elongated conductive line 451 and the second elongated conductive line 452 by penetrating the second insulation layer 532 in the stacking direction may be disposed to the overlapping region. At least part of a region opposed in the circumferential direction to the region in which the second elongated conductive line 452 overlaps with the first elongated conductive line 451 may be disposed to overlap with a third elongated conductive line 453 in a direction perpendicular to each of the first face 511 and second face 512 of the substrate 510. In this case, a second conductive via 457b which electrically couples the second elongated conductive line 452 and the third elongated conductive line 453 by penetrating the third insulation layer 533 in the stacking direction may be disposed to the overlapping region. At least part of a region opposed in the circumferential direction to the region in which the third elongated conductive line 453 overlaps with the second elongated conductive line 452 may be disposed to overlap with a fourth elongated conductive line 454 in a direction perpendicular to each of the first face 511 and second face 512 of the substrate 510. In this case, a third conductive via 457c which electrically couples the third elongated conductive line 453 and the fourth elongated conductive line 454 by penetrating the fourth insulation layer 544 in the stacking direction may be disposed to the overlapping region. At least part of a region opposed in the circumferential direction to the region in which the fourth elongated conductive line 454 overlaps with the third elongated conductive line 453 may be disposed to overlap with a fifth elongated conductive line 455 in a direction perpendicular to each of the first face 511 and second face 512 of the substrate 510. In this case, a fourth conductive via 457d which electrically couples the fourth elongated conductive line 454 and the fifth elongated conductive line 455 by penetrating the fifth insulation layer 535 in the stacking direction may be disposed to the overlapping region. In addition, at least part of a region opposed in the circumferential direction to the region in which the fifth elongated conductive line 455 overlaps with the fourth elongated conductive line 454 may be disposed to overlap with a sixth elongated conductive line 456 in a direction perpendicular to each of the first face 511 and second face 512 of the substrate 510. In this case, a fifth conductive via 457e which electrically couples the fifth elongated conductive line 455 and the sixth elongated conductive line 456 by penetrating the sixth insulation layer 536 in the stacking direction may be disposed to the overlapping region. According to an embodiment, the third antenna element 450 may be constructed in a circular shape when viewed from above the substrate 510. Each of the elongated conductive lines of the third antenna element 450 may be constructed in a circular shape as a whole by being disposed to be spaced apart by a specific interval from each of the elongated conductive lines of the second antenna element 440 disposed to the same insulation layer. According to an embodiment, each of the elongated conductive lines of the third antenna element 450 may be disposed to mutually face each of the elongated conductive lines of the first antenna element 430 disposed to the same insulation layer about a circular central axis.

A first elongated conductive line 461 of the fourth antenna element 460 according to various embodiments may be disposed to overlap with a second elongated conductive line 462 in at least some regions in a direction perpendicular to each of the first face 511 and second face 512 of the substrate 510. In this case, a first conductive via 467a which electrically couples the first elongated conductive line 461 and the second elongated conductive line 462 by penetrating the second insulation layer 532 in the stacking direction may be disposed to the overlapping region. At least part of a region opposed in the circumferential direction to the region in which the second elongated conductive line 462 overlaps with the first elongated conductive line 461 may be disposed to overlap with a third elongated conductive line 463 in a direction perpendicular to each of the first face 511 and second face 512 of the substrate 510. In this case, a second conductive via 467b which electrically couples the second elongated conductive line 462 and the third elongated conductive line 463 by penetrating the third insulation layer 533 in the stacking direction may be disposed to the overlapping region. At least part of a region opposed in the circumferential direction to the region in which the third elongated conductive line 463 overlaps with the second elongated conductive line 462 may be disposed to overlap with a fourth elongated conductive line 464 in a direction perpendicular to each of the first face 511 and second face 512 of the substrate 510. In this case, a third conductive via 467c which electrically couples the third elongated conductive line 463 and the fourth elongated conductive line 464 by penetrating the fourth insulation layer 544 in the stacking direction may be disposed to the overlapping region. At least part of a region opposed in the circumferential direction to the region in which the fourth elongated conductive line 464 overlaps with the third elongated conductive line 463 may be disposed to overlap with a fifth elongated conductive line 465 in a direction perpendicular to each of the first face 511 and second face 512 of the substrate 510. In this case, a fourth conductive via 467d which electrically couples the fourth elongated conductive line 464 and the fifth elongated conductive line 465 by penetrating the fifth insulation layer 535 in the stacking direction may be disposed to the overlapping region. In addition, at least part of a region opposed in the circumferential direction to the region in which the fifth elongated conductive line 465 overlaps with the fourth elongated conductive line 464 may be disposed to overlap with a sixth elongated conductive line 466 in a direction perpendicular to each of the first face 511 and second face 512 of the substrate 510. In this case, a fifth conductive via 467e which electrically couples the fifth elongated conductive line 465 and the sixth elongated conductive line 466 by penetrating the sixth insulation layer 536 in the stacking direction and may be disposed to the overlapping region. According to an embodiment, the fourth antenna element 460 may be constructed in a circular shape when viewed from above the substrate 510. Each of the elongated conductive lines of the fourth antenna element 460 may be constructed in a circular shape as a whole by being disposed to be spaced apart by a specific interval from each of the elongated conductive lines of the first antenna element 430 and third antenna element 450 disposed to the same insulation layer. According to an embodiment, each of the elongated conductive lines of the fourth antenna element 460 may be disposed to mutually face each of the elongated conductive lines of the second antenna element 440 disposed to the same insulation layer about a circular central axis.

According to various embodiments, one end 4311 of at least one element (e.g., the first helical antenna 430) among the first to fourth antenna elements 430 to 460 may be electrically coupled with the wireless communication circuit 550 disposed to the first face 511 of the substrate 510. According to an embodiment, the first antenna element 430 and the wireless communication circuit 550 may be electrically coupled through a feeding via 551. According to an embodiment, the wireless communication circuit 550 may provide a first signal having a frequency between 3 GHz and 100 GHz through a first point (e.g., A1 of FIG. 4C) which is any one region of the one end 4311 of the first elongated conductive line 431 of the first antenna element 430. According to an embodiment, the wireless communication circuit 550 may provide a second signal having a frequency between 3 GHz and 100 GHz through a second point (e.g., A2 of FIG. 4C) which is any one region of one end of the first elongated conductive line 441 of the second antenna element 440. According to an embodiment, the wireless communication circuit 550 may provide a third signal having a frequency between 3 GHz and 100 GHz through a third point (e.g., A3 of FIG. 4C) which is any one region of one end of the first elongated conductive line 451 of the first antenna element 450. According to an embodiment, a difference of input phases of the first and third signals may be approximately 180 degrees, and reverse-phase signals including the same information may be input as the first and third signals. According to an embodiment, the wireless communication circuit 550 may provide a fourth signal having a frequency between 3 GHz and 100 GHz through a fourth point (e.g., A4 of FIG. 4C) which is any one region of one end of the first elongated conductive line 461 of the first antenna element 460.

Referring to FIG. 4C, a difference of input phases of the second and fourth signals according to various embodiments may be approximately 180 degrees, and reverse-phase signals including the same information may be input as the second and fourth signals. As another example, the first point A1 and the third point A3 may be disposed to face each other, and the second point A2 and the fourth point A4 may be disposed to face each other. In this case, a signal provided to the first point A1 and the third point A3 and a signal provided to the second point A2 and the fourth point A4 may be disposed to be perpendicular to each other. According to an embodiment, in the first to fourth antenna elements 430, 440, 450, and 460 which constitute one helical antenna as a whole, reverse-phase signals including the same information are input to have the same phase difference (e.g., 180 degrees) with respect to the first antenna element 430 and the third antenna element 450, so that a first antenna pair including the first and third antenna elements 430 and 450 disposed to face each other about a central axis may operate as a virtual dipole antenna. Revere-phase signals including the same information may be input to have a specific phase difference (e.g., 180 degrees) with respect to the second antenna element 440 and the fourth antenna element 460, so that a second antenna pair including the second and fourth helical antennas 440 and 460 may operate as a virtual dipole antenna. According to an embodiment, a vertical electromagnetic wave (a vertically polarized wave) may be radiated in the first antenna pair. According to another embodiment, a horizontal electromagnetic wave (a horizontally polarized wave) may be radiated in the second antenna pair.

Figure 4E:
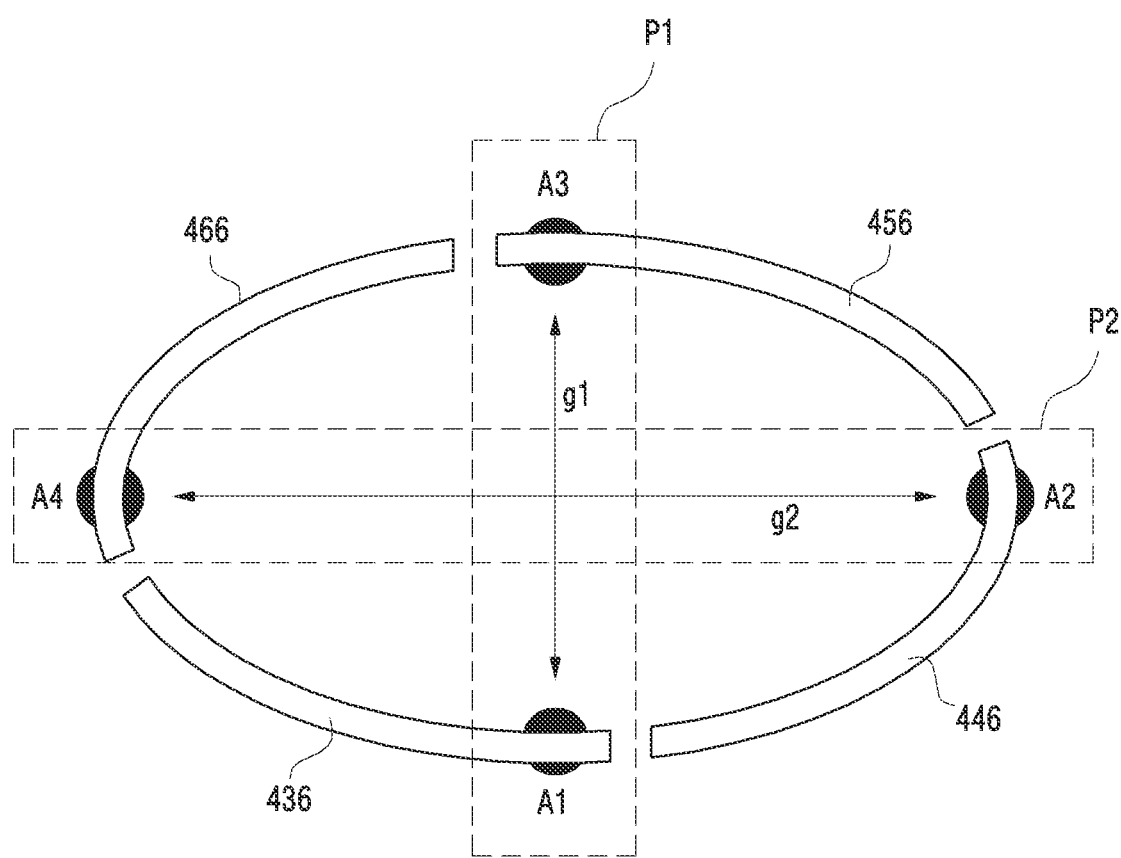
FIG. 4E is a top view of a helical antenna according to another embodiment, different from the helical antenna of FIG. 4B according to various embodiments.

FIG. 4C is a top view of the helical antenna 400 of FIG. 4B according to various embodiments, and FIG. 4D and FIG. 4E are top views of the helical antenna of FIG. 4C according to another embodiment.

Referring to FIG. 4C, FIG. 4D, and FIG. 4E, the helical antenna 400 may include the first to fourth antenna elements 430, 440, 450, and 460. According to an embodiment, the first to fourth antenna elements 430, 440, 450, and 460 may include the sixth elongated conductive lines 436, 446, 456, and 466 disposed to an insulation layer (e.g., 537 of FIG. 4A) adjacent to the second face 512 among the plurality of insulation layers 530. According to an embodiment, the sixth elongated conductive line 436 of the first antenna element 430 and the sixth elongated conductive line 456 of the third antenna element 450 may be disposed to face each other about a central axis. According to an embodiment, an end 4362 of the sixth elongated conductive line 436 of the first antenna element 430 and an end 4562 of the sixth elongated conductive line 456 of the third antenna element 450 may be disposed to face each other about the central axis. In this case, a first antenna pair P1 including the first antenna element 430 and the third antenna element 450 may constitute a virtual dipole antenna. According to an embodiment, the sixth elongated conductive line 446 of the second helical antenna 440 and the sixth elongated conductive line 466 of the fourth antenna element 460 may be disposed to face each other about the central axis. According to an embodiment, an end 4462 of the sixth elongated conductive line 446 of the second antenna element 440 and an end 4662 of the sixth elongated conductive line 466 of the fourth antenna element 40 may be disposed to face each other about the central axis. In this case, a second antenna pair P2 of the second antenna element 440 and the fourth antenna element 460 may constitute a virtual dipole antenna. According to an embodiment, when a length of an end of at least one of the sixth elongated conductive lines 436, 446, 456, and 466 is adjusted in order to adjust an operating frequency band, lengths of the sixth elongated conductive lines disposed to face each other may be adjusted to values corresponding to each other.

According to various embodiments, for the first and third antenna elements 430 and 450 constituting the first antenna pair P1, signals each of which has a different input phase in the range of a frequency between 3 GHz and 100 GHz may be provided through a phase shifter (e.g., phase shifters 631 and 632 of FIG. 5) of the wireless communication circuit 550. For the second and fourth antenna elements 440 and 460 constituting the second antenna pair P2, signals each of which has a different input phase in the range of a frequency between 3 GHz and 100 GHz may be provided through a phase shifter (e.g., phase shifters 63e and 634 of FIG. 5) of the wireless communication circuit 550. In an embodiment, a first signal may be provided to the first point A1 of the first antenna element 430, and a third signal having a designated phase difference with respect to the first signal may be provided to the third point A3 of the third helical antenna 450. In an embodiment, a second signal may be provided to the second point A2 of the second antenna element 440, and a fourth signal having a designated phase difference with respect to the second signal may be provided to the fourth point A4 of the fourth helical antenna 460. In an embodiment, a difference value of input phases of the first and third signals may include approximately 180 degrees. In another embodiment, a difference value of input phases of the second and fourth signals may include approximately 180 degrees. According to an embodiment, the first antenna pair P1 and the second antenna pair P2 may radiate polarized waves of different directions. According to an embodiment, the polarized waves may be orthogonal to each other. In an embodiment, signals having opposite polarities may be provided to the first antenna pair P1 to operate as a virtual dipole antenna. For example, a vertical electromagnetic wave (a vertically polarized wave) may be radiated in the first antenna pair P1. According to another embodiment, signals having opposite polarities may be provided to the second antenna pair P2 to operate as a virtual dipole antenna. For example, a horizontal electromagnetic wave (a horizontally polarized wave) may be radiated in the second antenna pair P2. According to an embodiment, the single antenna structure 501 occupying a single size may be used to provide signals having a designated phase difference and having different polarities to the first antenna pair P1 and the second antenna pair P2, thereby implementing a dual polarized antenna which radiates different polarized waves. According to another embodiment, the first end 4362 of the sixth elongated conductive line 436 of the first antenna element 430 and the first end 4562 of the sixth elongated conductive line 456 of the third antenna element 450 may be disposed to face each other about a central axis.

According to an embodiment, a length of the sixth elongated conductive line 436 of the first antenna element 430 and a length of the sixth elongated conductive line 456 of the third antenna element 450 may be adjusted to adjust a resonant frequency. For example, referring to FIG. 4D, each of some regions of second ends 4361 and 4561 may be deleted to decrease a length thereof, so as to transmit and/or receive a signal having a higher resonant frequency than the conventional case.

According to an embodiment, a length of the second elongated conductive line 446 of the second antenna element 440 and a length of the sixth elongated conductive line 466 of the fourth antenna element 460 may be adjusted to adjust a resonant frequency. For example, the length of the sixth elongated conductive line 446 of the second antenna element 440 and the length of the sixth elongated conductive line 466 of the fourth antenna element 460 may be increased so as to transmit and/or receive a signal having a lower resonant frequency than the conventional case.

According to an embodiment, the length of the sixth elongated conductive line 436 of the first antenna element 430 and the length of the sixth elongated conductive line 456 of the third antenna element 450 may be configured to be shorter than the length of the sixth elongated conductive line 446 of the second antenna element 440 and the length of the sixth elongated conductive line 466 of the fourth antenna element 460, thereby implementing polarized antennas of different bands.

Referring to FIG. 4E, the first antenna element 430 to the fourth antenna element 460 may be constructed in an elliptical shape as a whole. In an embodiment, each of the first to fourth antenna elements 430 and 460 may be constructed to have the same length. In an embodiment, an end of the first antenna element 430 and an end of the third antenna element 450 may be disposed to face each other. In this case, the first point A1 of the first antenna element 430 and the third point A3 of the third antenna element 450 may be spaced apart to have a first interval g1. An end of the second antenna element 440 and an end of the fourth antenna element 460 may be disposed to face each other. In this case, the second point A2 of the second antenna element 440 and the fourth point A4 of the fourth antenna element 460 may be spaced apart to have a second interval g2. In an embodiment, a vertically polarized wave caused by the first antenna element 430 and the third antenna element 450 may be radiated, and a horizontally polarized wave caused by the second antenna element 440 and the fourth antenna element 460 may be radiated. In various embodiments, the first interval g1 and the second interval g2 may be different distances. In an embodiment, the first interval g1 may be shorter than the second interval g2. In this case, the vertically polarized wave caused by the first antenna element 430 and the third antenna element 450 may have a higher resonant frequency than the horizontally polarized wave caused by the second antenna element 440 and the fourth antenna element 460.

Figure 5:
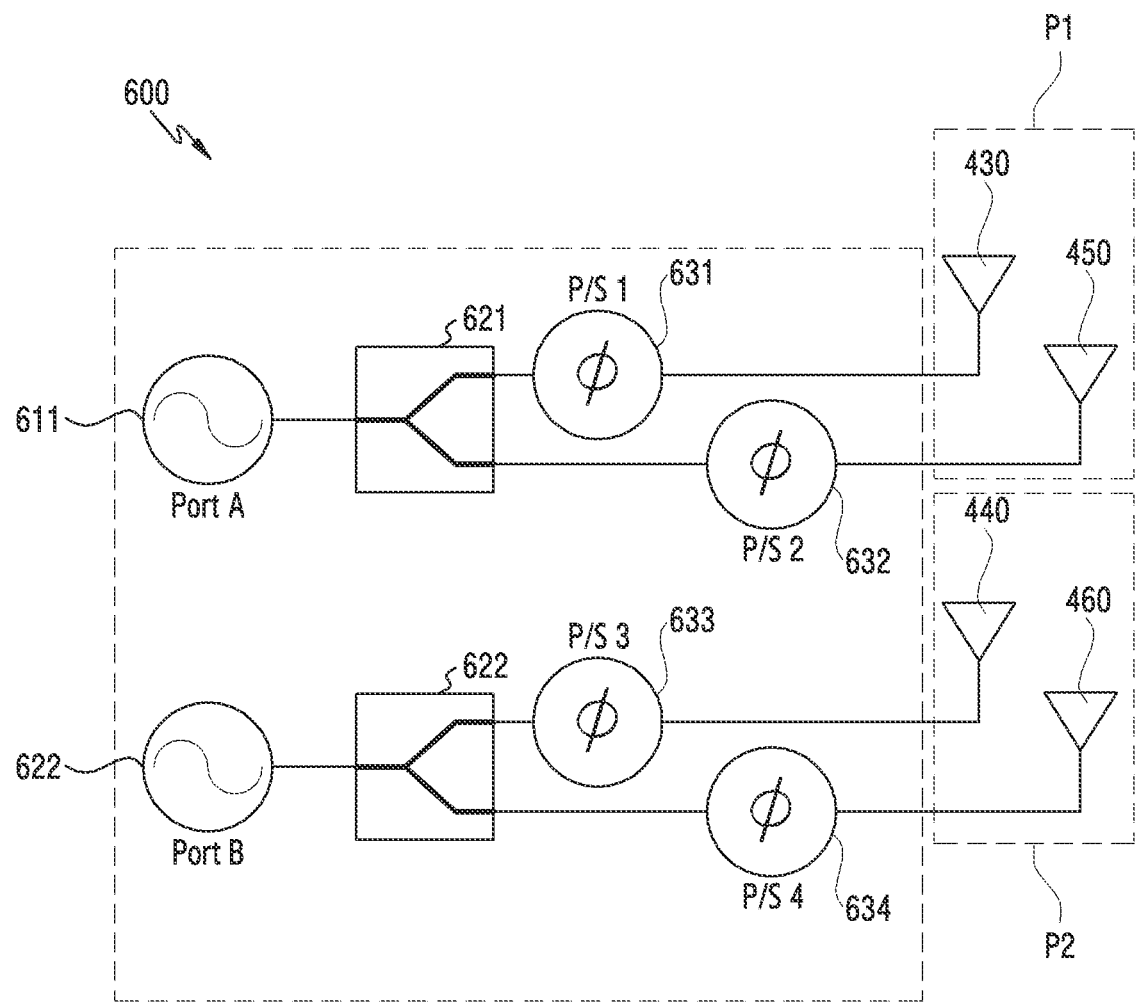
FIG. 5 illustrates a wireless communication circuit according to various embodiments.

FIG. 5 illustrates a wireless communication circuit according to various embodiments.

The communication circuit of FIG. 5 may be at least in part similar to the communication circuit 362 of FIG. 3A, or may include other embodiments of the communication circuit.

Referring to FIG. 5, a wireless communication circuit 600 may include at least one power input port, at least one distribution circuit, and at least one phase shifter. According to an embodiment, the wireless communication circuit 600 may include at least one of a first power input port 611 for supplying power to a first antenna pair P1 and a second power input port 612 for supplying power to a second antenna pair P2. According to an embodiment, the wireless communication circuit 600 may include a first distribution circuit 621 for distributing the power provided from the first power input port 611 to a first phase shifter 631 and a second phase shifter 632. According to an embodiment, the wireless communication circuit 600 may include a second distribution circuit 622 for distributing the power provided from the second power input port 612 to a third phase shifter 633 and a fourth phase shifter 634. According to an embodiment, the wireless communication circuit 600 may include the first phase shifter 631 for arbitrarily adjusting an input phase of a first signal provided to the first antenna element 430 and/or the second phase shifter 632 for arbitrarily adjusting an input phase of a second signal provided to the second antenna element 440. According to an embodiment, the wireless communication circuit 600 may include the third phase shifter 633 for arbitrarily adjusting an input phase of a third signal provided to the third antenna element 450 and/or the fourth phase shifter 634 for arbitrarily adjusting an input phase of a fourth signal provided to the fourth antenna element 460.

According to various embodiments, the wireless communication circuit 600 may adjust the first phase shifter 631 and/or the second phase shifter 632 to adjust each input phase so that the first signal provided to the first point A1 of the first antenna element 430 and the third signal provided to the third point A3 of the third antenna element 450 have a specific phase difference. According to an embodiment, the wireless communication circuit 600 may adjust the third phase shifter 633 and/or the fourth phase shifter 634 to adjust each input phase so that the second signal provided to the second point A2 of the second antenna element 400 and the fourth signal provided to the fourth point A4 of the fourth antenna element 460 have a specific phase difference. According to an embodiment, when the first phase shifter 631 provides the first antenna element 430 with the first signal of a designated phase (e.g., 0 degrees), which has a frequency between 3 GHz and 100 GHz, the second phase shifter 632 may provide the third antenna element 450 with the third signal having a designated input phase difference (e.g., 180 degrees) with respect to the first signal having the aforementioned frequency. In this case, the first antenna element 430 and the third helical antenna 450 may operate as virtual dipole antennas since reverse-phase signals including the same information, each of which has a phase difference of 180 degrees, are provided. According to an embodiment, when the third phase shifter 633 provides the second antenna element 440 with the second signal of a designated phase (e.g., 0 degrees), which has a frequency between 3 GHz and 100 GHz, the fourth phase shifter 634 may provide the fourth antenna element 460 with the fourth signal having a frequency between 3 GHz and 100 GHz and having a designated input phase difference (e.g., 180 degrees) with respect to the second signal. In this case, the second antenna element 440 and the fourth antenna element 460 may operate as virtual dipole antennas since reverse-phase signals including the same information, each of which has a phase difference of 180 degrees, are provided.

According to various embodiments, when the input phase difference between the first and third antenna elements 430 and 450 is adjusted to 180 degrees through the first phase shifter 631 and the second phase shifter 632, a vertical electromagnetic wave (a vertically polarized wave) may be radiated. According to an embodiment, when an input phase difference between the second antenna element 440 and the fourth antenna element 460 is adjusted to 180 degrees through the third phase shifter 633 and the fourth phase shifter 634, a horizontal electronic wave (a horizontally polarized wave) orthogonal to the vertically polarized wave caused by the first antenna element 430 and the third antenna element 450 may be radiated. According to various embodiments, dual polarized waves orthogonal to each other may be supported through the same antenna structure.

Figure 6A:
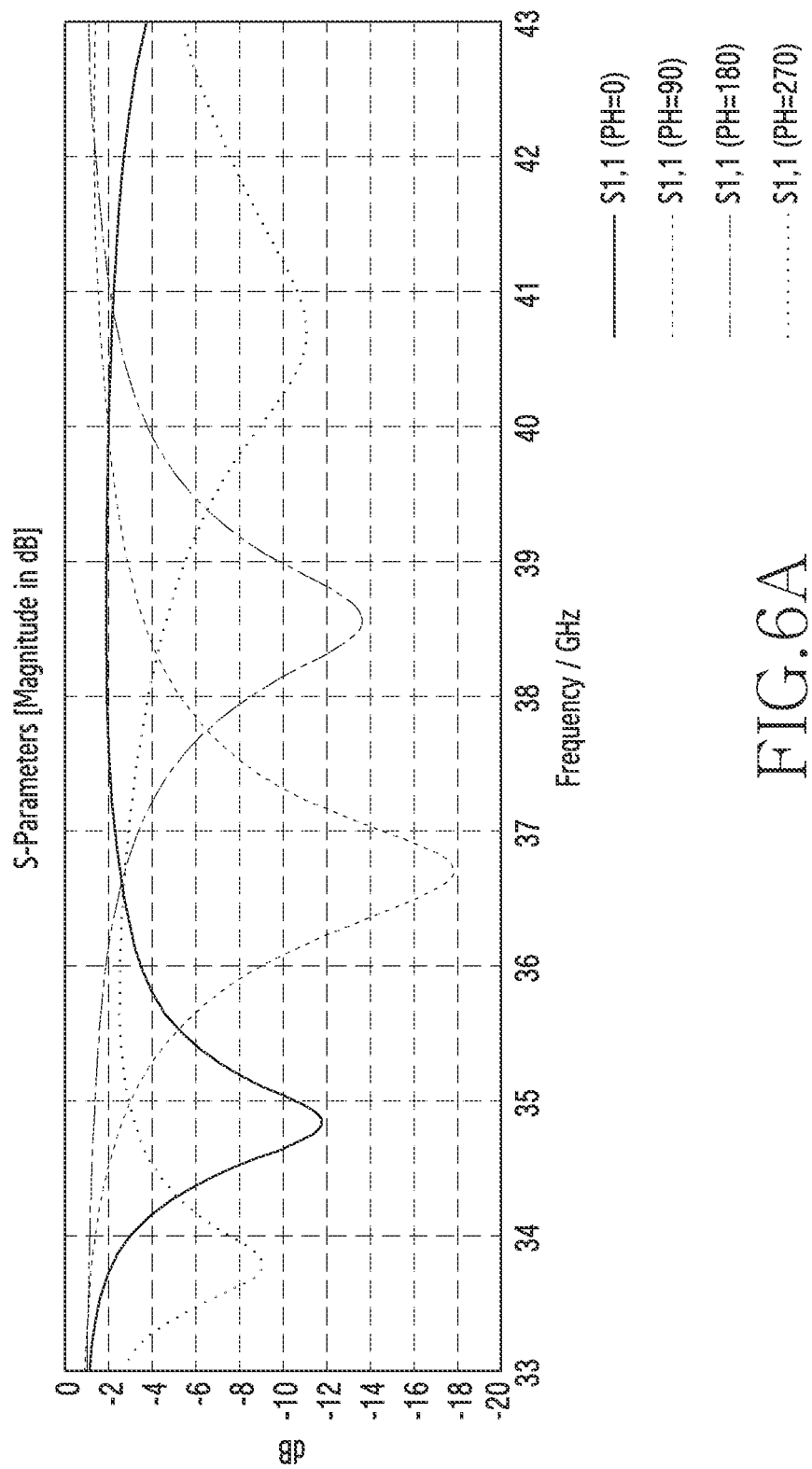
FIG. 6A illustrates an antenna resonance characteristic based on a combination of input phases according to various embodiments.

FIG. 6A illustrates an antenna resonance characteristic based on a combination of input phases, and is a graph illustrating a change in a resonant frequency of a helical antenna, viewed at a first point A1, in each of cases where a phase shift difference of a first signal applied to the first point A1 of a first antenna element (e.g., the first antenna element 430 of FIG. 4B) and a third signal applied to a third point A3 of a third antenna element (e.g., the third antenna element 450 of FIG. 4B) or a phase shift difference of a second signal applied to a second pint A2 of a second antenna element (e.g., the second antenna element 440 of FIG. 4B) and a fourth signal applied to a fourth point A4 of a fourth antenna element (e.g., the fourth antenna element 460 of FIG. 4B) is 0, 90, 180, and 270 degrees. Referring to FIG. 6A, when signals provided to antenna elements facing each other (e.g., the first antenna element 430 and the third antenna element 450, and the second antenna element 440 and the fourth antenna element 460) are reverse-phase signals having a phase difference of 180 degrees, it can be seen that a resonance occurs in a specific frequency band (e.g., 38 to 39 GHz).

Figure 6B:
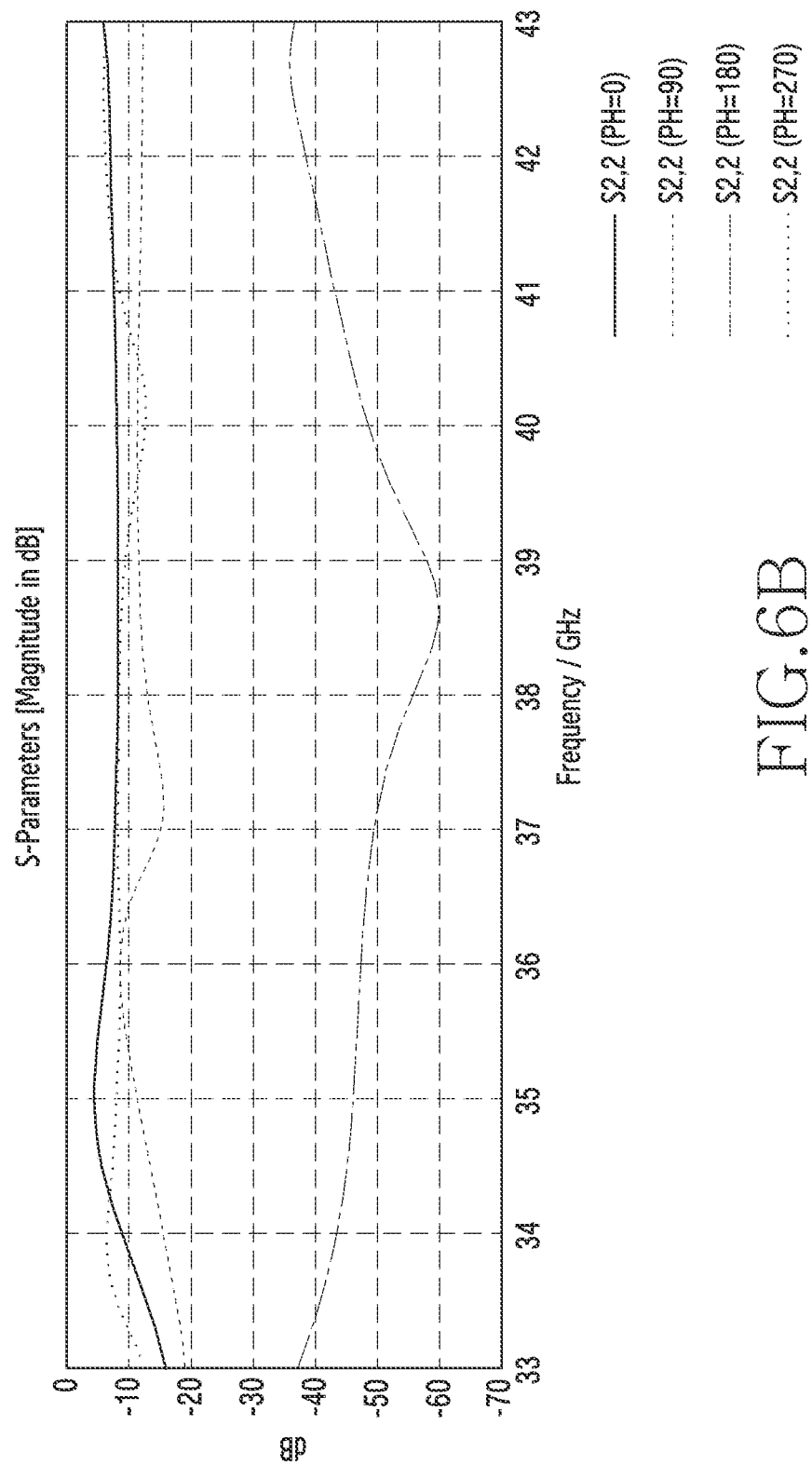
FIG. 6B is a graph illustrating an antenna isolation characteristic based on a combination of input phases of a helical antenna according to various embodiments.
Figure 6C:
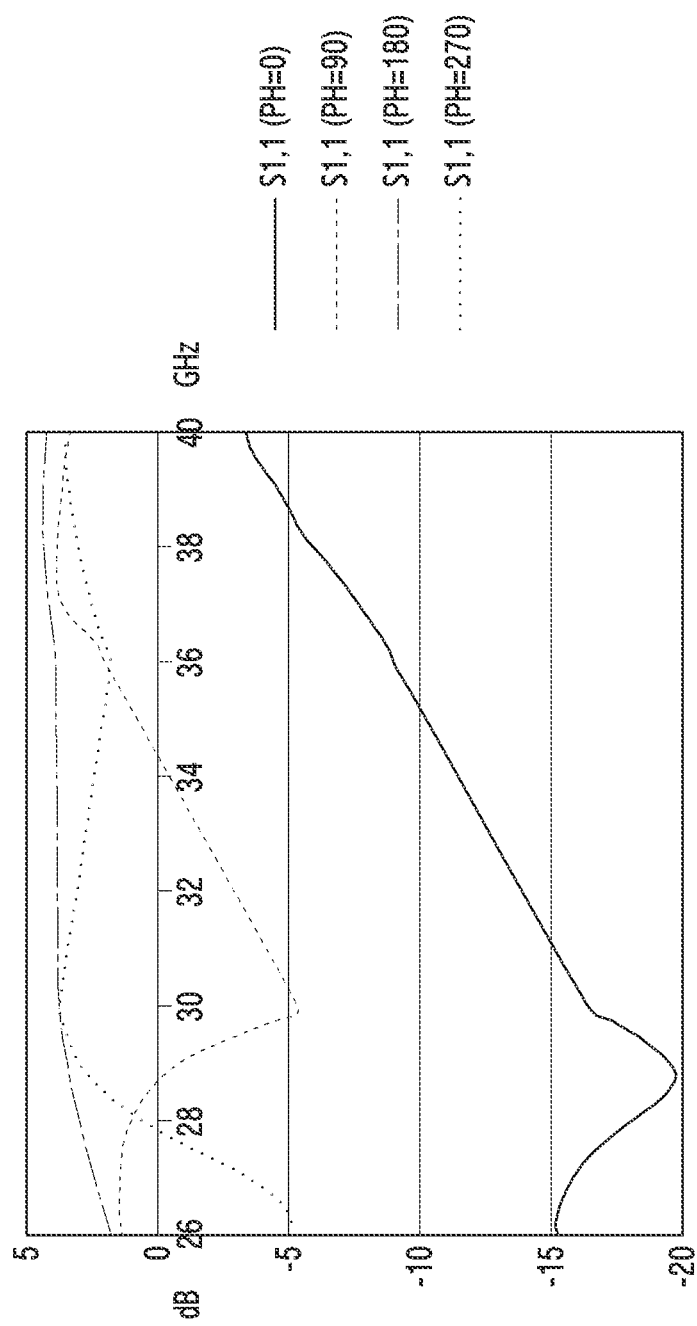
FIG. 6C is a graph illustrating a change in an antenna gain based on a combination of input phases of a helical antenna according to various embodiments.

FIG. 6B and FIG. 6C are graphs illustrating a change in an antenna gain and an antenna isolation characteristic based on a combination of input phases provided to the helical antenna 400. Referring to FIG. 6B, when an input phase difference between a first signal provided to a first antenna element (e.g., the first antenna element 430 of FIG. 4B) and a third signal provided to a third antenna element (e.g., the third antenna element 450 of FIG. 4B) and an input phase difference between a second signal provided to a second antenna element (e.g., the second antenna element 440 of FIG. 4B) and a fourth signal provided to a fourth antenna element (e.g., the fourth antenna element 460 of FIG. 4B) are 180 degrees, an isolation characteristic between a first antenna pair (e.g., the first antenna pair P1 of FIG. 5) including the first antenna element (e.g., the first antenna element 430 of FIG. 4B) and the third antenna element (e.g., the third antenna element 460 of FIG. 4B) according to the first power input port 611 and a second antenna pair (e.g., the second antenna pair P2 of FIG. 5) including the second antenna element (e.g., the second antenna element 44 of FIG. 4B) and the fourth antenna element (e.g., the fourth antenna element 460 of FIG. 4B) according to the second power input port 612 is less than or equal to −50 dB, and thus it can be seen that the isolation characteristic is excellent.

Referring to FIG. 6C, it can be seen that a gain is the most excellent in a specific frequency (e.g., 38 to 39 GHz) when the input phase difference between the first signal provided to the first antenna element (e.g., the first antenna element 430 of FIG. 4B) and the third signal provided to the third antenna element (e.g., the third antenna element 450 of FIG. 4B) and the input difference between the second signal provided to the second antenna element (e.g., the second antenna element 440 of FIG. 4B) and the fourth signal provided to the fourth antenna element (e.g., the fourth antenna element 460 of FIG. 4B) are 180 degrees.

Figure 7:
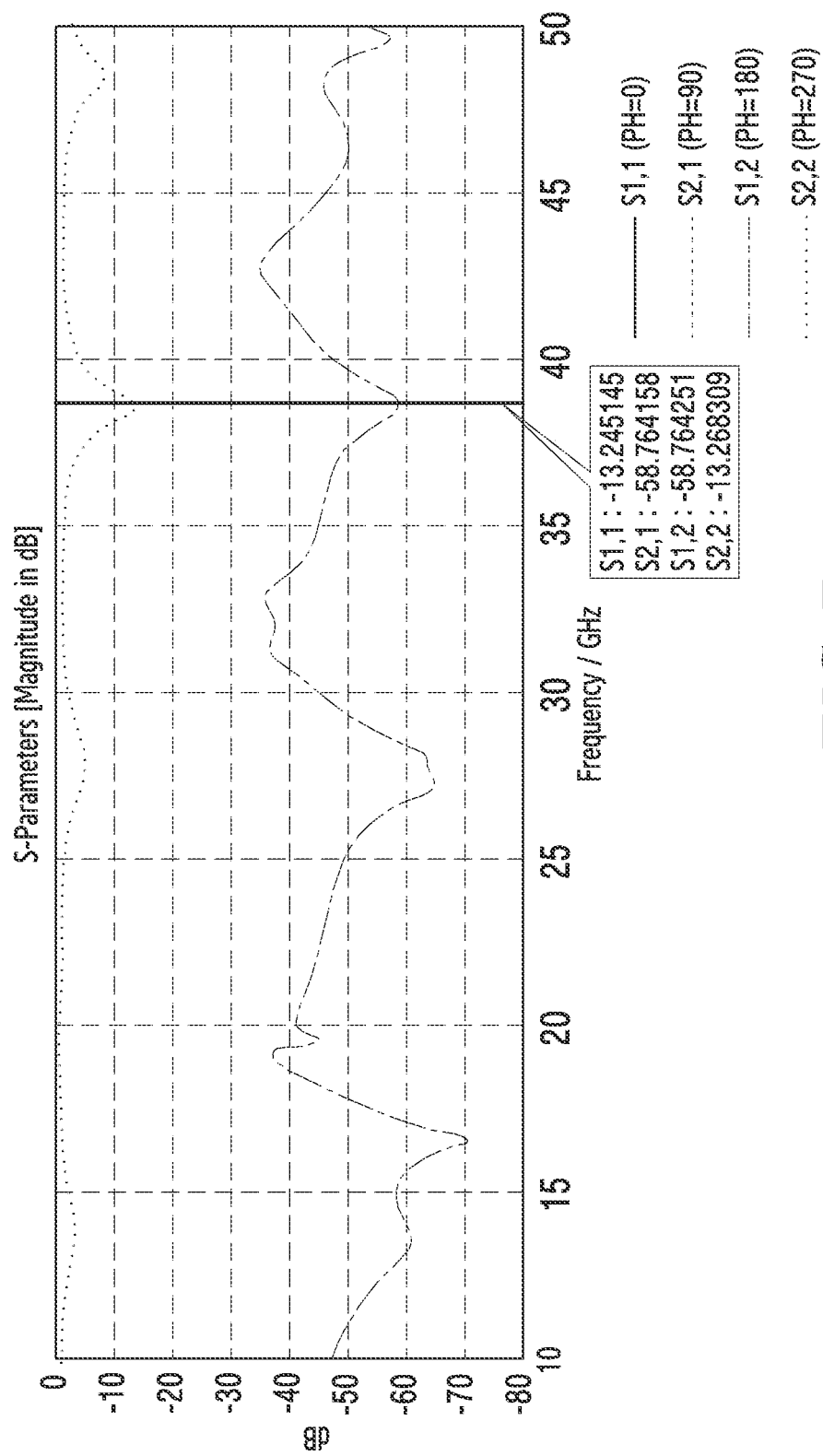
FIG. 7 is a graph illustrating a loss caused by antenna reflection, based on a combination of input phases of a helical antenna according to various embodiments.

FIG. 7 is a graph illustrating a loss (a return loss) caused by antenna reflection in a 39 GHz band, based on a combination of input phases provided to the helical antenna 400. When the input phases are combined such that a phase difference between input signals each of which is input to the first antenna pair P1 including the first antenna element 430 and the third antenna element 450 is 180 degrees, a loss caused by antenna radiation in the 39 GHz band is approximately (−)60. Therefore, it can be seen that the loss caused by the antenna radiation is minimum.

Figure 8:
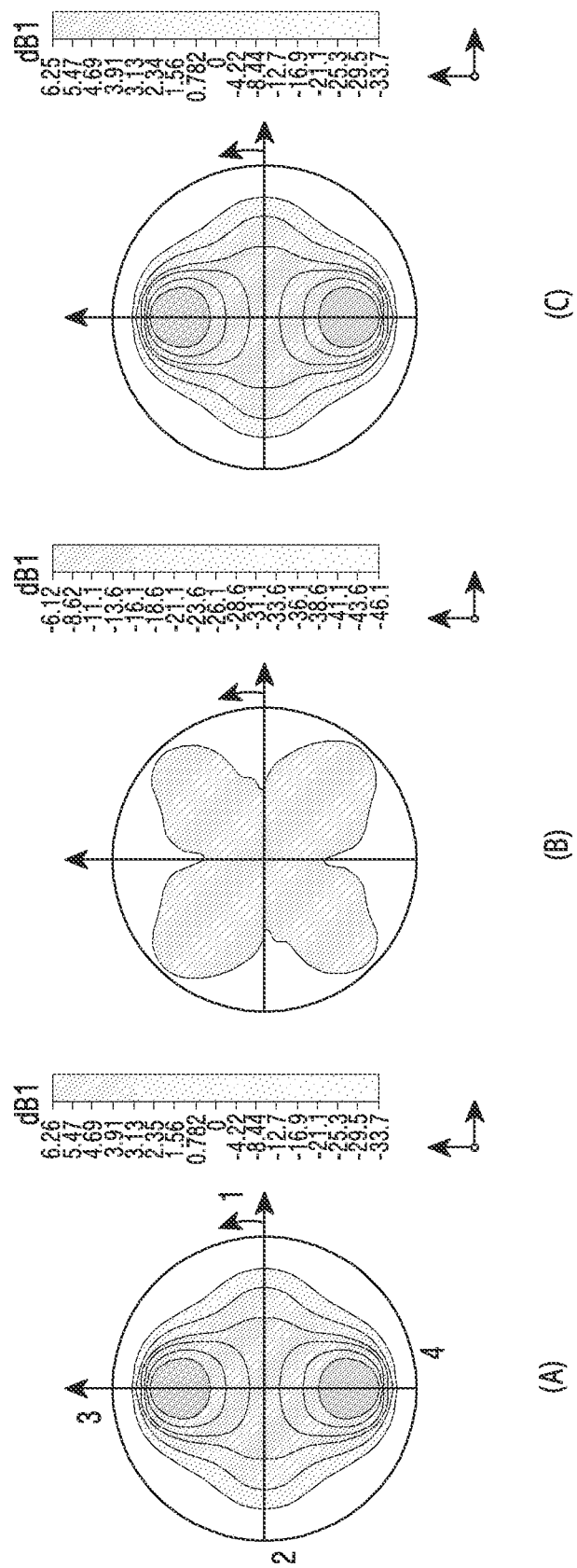
FIG. 8 and FIG. 9 illustrate a radiation pattern of an antenna, based on a combination of input phases of a helical antenna according to various embodiments.

FIG. 8 illustrates a radiation pattern of a first antenna pair (e.g., the first antenna pair P1 of FIG. 5) including a first antenna element (e.g., the first antenna element 430 of FIG. 4B) and a third antenna element (e.g., the third antenna element 450 of FIG. 4B) which have an input phase difference of 180 degrees in an embodiment, under the assumption that input phases of the first antenna element (e.g., the first antenna element 430 of FIG. 4B) and the third antenna element (e.g., the third antenna element 450 of FIG. 4B) are respectively set to 0 and 180 degrees and thus a phase difference between the two input phases is 180 degrees. In an embodiment, a reserve-phase signal may be provided in such a manner that an input phase of a first signal provided to a first point (e.g., 1 in (a) of FIG. 8) of the first antenna element (e.g., the first antenna element 430 of FIG. 4B) is adjusted to 0 degrees and an input phase of a third signal provided to a third point (e.g., 2 in (a) of FIG. 8) of the third antenna element 450 is adjusted to 180 degrees. When the first antenna pair is configured to operate as a virtual dipole antenna, a component ((c) of FIG. 8) of a vertically polarized wave and a component ((b) of FIG. 8) measured at a receiving end may be identified. In addition, when the vertically polarized wave component and the horizontally polarized wave component are combined, a (+) electric field is formed in a (+) direction of a y-axis and a (−) electric field is formed in a (−) direction of the y-axis (e.g., (a) of FIG. 8), and it can be identified that a vertical electromagnetic wave (a vertically polarized wave) is radiated. In this case, as a result of measurement at the receiving end, it can be identified that a detection result ((b) of FIG. 8) of the horizontally polarized wave component has a good isolation characteristic of polarized waves, considering a detection result (c of FIG. 8) of the vertically polarized component.

Figure 9:
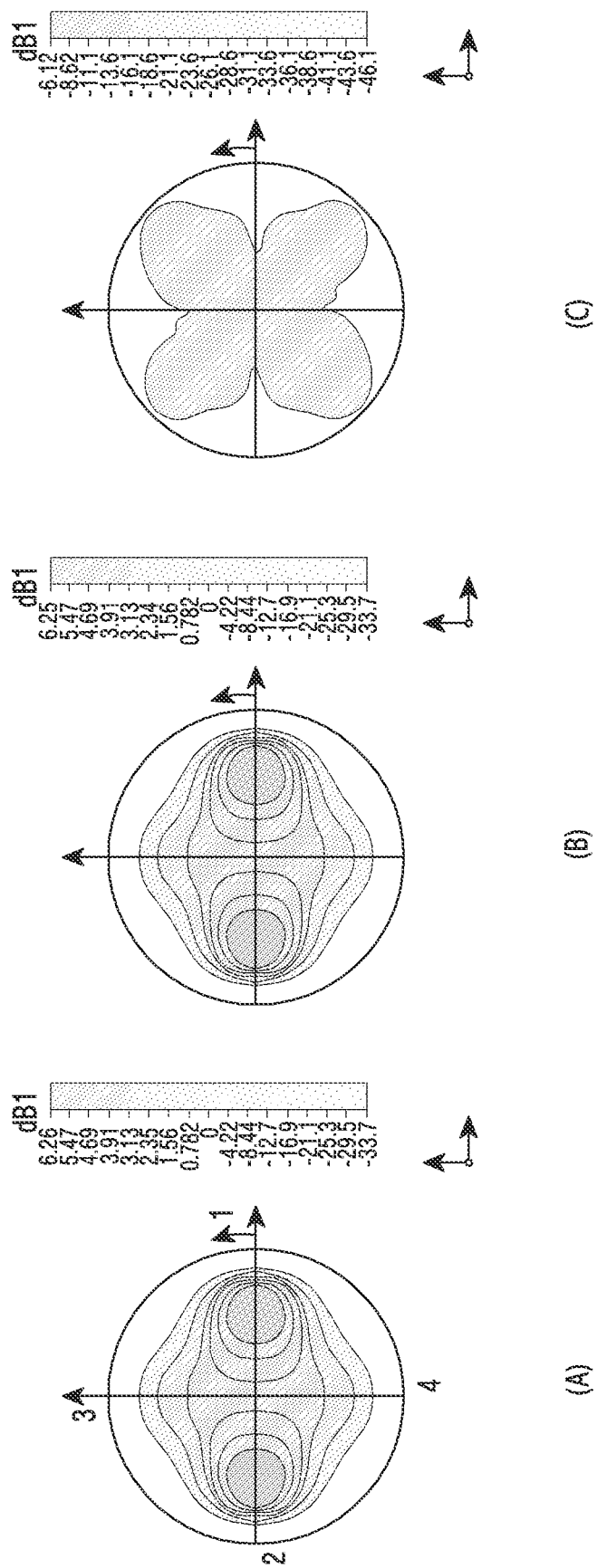

FIG. 9 illustrates a radiation pattern of a second antenna pair (e.g., the second antenna pair P2 of FIG. 5) including a second antenna element (e.g., the second antenna element 440 of FIG. 4B) and a fourth antenna element (e.g., the fourth antenna element 460 of FIG. 4B) which have an input phase difference of 180 degrees in an embodiment, under the assumption that input phases of the second antenna element (e.g., the second antenna element 440 of FIG. 4B) and the fourth antenna element (e.g., the fourth antenna element 460 of FIG. 4B) are respectively set to 0 and 180 degrees and thus a phase difference between the two input phases is 180 degrees. In an embodiment, a reserve-phase signal may be provided in such a manner that an input phase of a second signal provided to a second point (e.g., 3 of FIG. 9A) of the second antenna element (e.g., the second antenna element 440 of FIG. 4B) is adjusted to 0 degrees and an input phase of a fourth signal provided to a fourth point (e.g., 4 of FIG. 9A) of the third antenna element 460 is adjusted to 180 degrees. When the second antenna pair is configured to operate as a virtual dipole antenna, a component ((b) of FIG. 9) of a vertically polarized wave and a component ((c) of FIG. 9) measured at a receiving end may be identified. In addition, when the vertically polarized wave component and the horizontally polarized wave component are combined, a (+) electric field is formed in a (+) direction of an x-axis and a (−) electric field is formed in a (−) direction of the x-axis (e.g., (a) of FIG. 9), and it can be identified that a vertical electromagnetic wave (a vertically polarized wave) aligned in an x-axis direction is radiated. Referring to FIG. 8 and FIG. 9, in the communication device 500 according to various embodiments, input phases of signals provided to the first to fourth antenna elements 430, 440, 450, and 460 may be adjusted so that a phase difference between respective signals provided to the first antenna element 430 and third antenna element 450 which are disposed to face each other is a specific value (e.g., approximately 180 degrees), so that a phase difference between respective signals provided to the second antenna element 440 and fourth antenna element 460 which are disposed to face each other is a specific value (e.g., approximately 180 degrees). Therefore, it can be identified that dual polarized waves orthogonal to each other can be formed through a configuration of the helical antenna 400 constructed as a single structure.

FIG. 10 is a top view of a helical antenna according to various embodiments.

Referring to FIG. 10, the helical antenna according to various embodiments may be constructed in a circular ring shape as a whole, when viewed from above as shown in FIG. 4C and/or FIG. 4D.

According to an embodiment, the ring shape may include a rectangular ring shape as a whole when viewed from above as shown in FIG. 10B. According to an embodiment, the ring shape may include a rectangular ring shape in which each corner is constructed to be rounded when viewed from above as shown in FIG. 10A. According to an embodiment, the ring shape may include a hexagonal ring shape as a whole as shown in FIG. 10C. Without being limited thereto, it is obvious to those ordinarily skilled in the art that the ring shape may include a shape in which the first antenna element 430 and the third antenna element 450 are symmetrical about a center of a ring, and the second antenna element 440 and the fourth antenna element 460 are symmetrical to each other.

Figure 11:
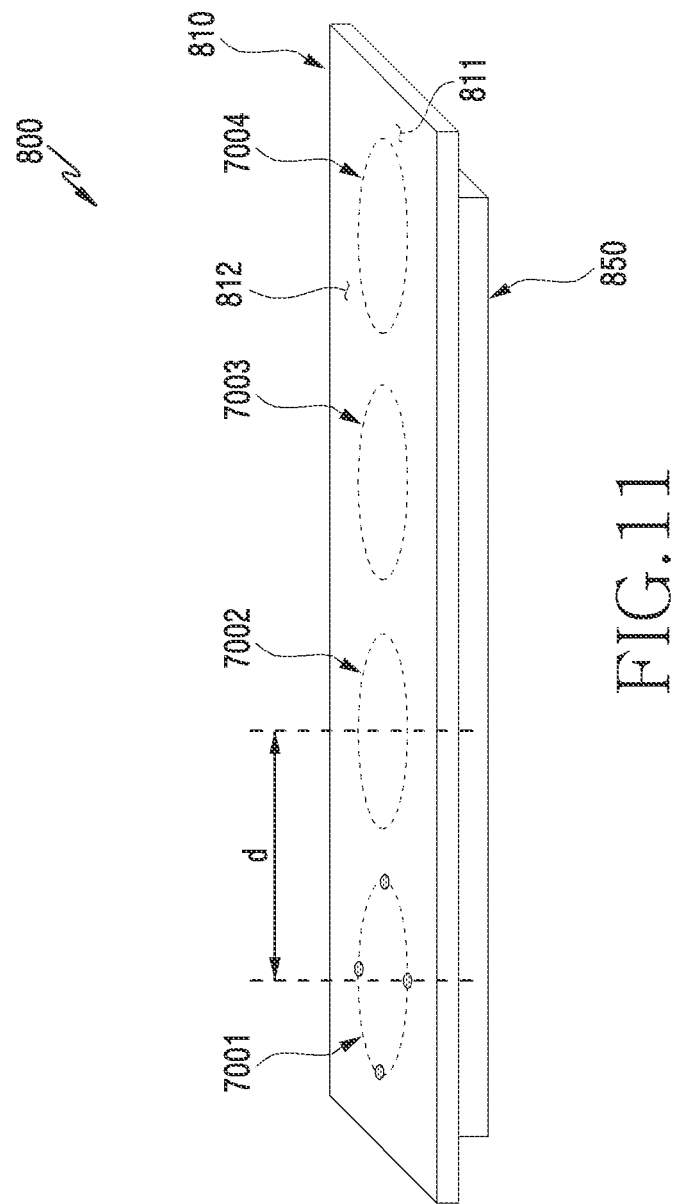
FIG. 11 is a perspective view of a communication device according to various embodiments.

FIG. 11 is a perspective view of a communication device according to various embodiments. A communication device 800 of FIG. 11 may be at least in part similar to the communication device 500 of FIG. 4A, or may include other embodiments of the communication devices.

Referring to FIG. 11, the communication device 800 may include a substrate 810 including a first face 811 and a second face 812 facing away from the first face 811. According to an embodiment, the communication device 800 may include a first helical antenna 7001 (e.g., the helical antenna 400 of FIG. 4B) constructed by penetrating at least part of a substrate from the first face 811 toward the second face 812. The communication device 800 may include a second helical antenna 7002, a third helical antenna 7003, and/or a fourth helical antenna 7004 which are disposed to be spaced apart by a specific interval 'd' from the first helical antenna 7001. The communication device 800 may include a wireless communication circuit 850 disposed to the first face 811 of the substrate 810 and electrically coupled with the first helical antenna 7001, the second helical antenna 7002, the third helical antenna 7003, and/or the fourth helical antenna 7004. The first to fourth helical antennas 7001, 7002, 7003, and 7004 may include the first and third antenna elements 430 and 450 and the second and fourth antenna elements 440 and 460, which are disposed to face each other, as shown in FIG. 4B to FIG. 4D.

According to an embodiment, the communication device 800 may adjust an input phase of a signal provided to first to fourth antenna elements of first to fourth helical antennas 7001, 7002, 7003, and 7004, through the first helical antenna 7001, the second helical antenna 7002, the third helical antenna 7003, the fourth helical antenna 7004, and/or the wireless communication circuit 850. For example, a phase difference between respective signals provided to the first antenna element and the third antenna element, which are disposed to face each other, of the first to fourth helical antenna 7001, 7002, 7003, and 7004 is adjusted to be a specific value (e.g., approximately 180 degrees), and a phase difference between respective signals provided to the second antenna element and fourth antenna element which are disposed to face each other is adjusted to be a specific value (e.g., approximately 180 degrees), so that dual polarized waves orthogonal to each other can be formed through the first to fourth antenna elements.

Figure 12:
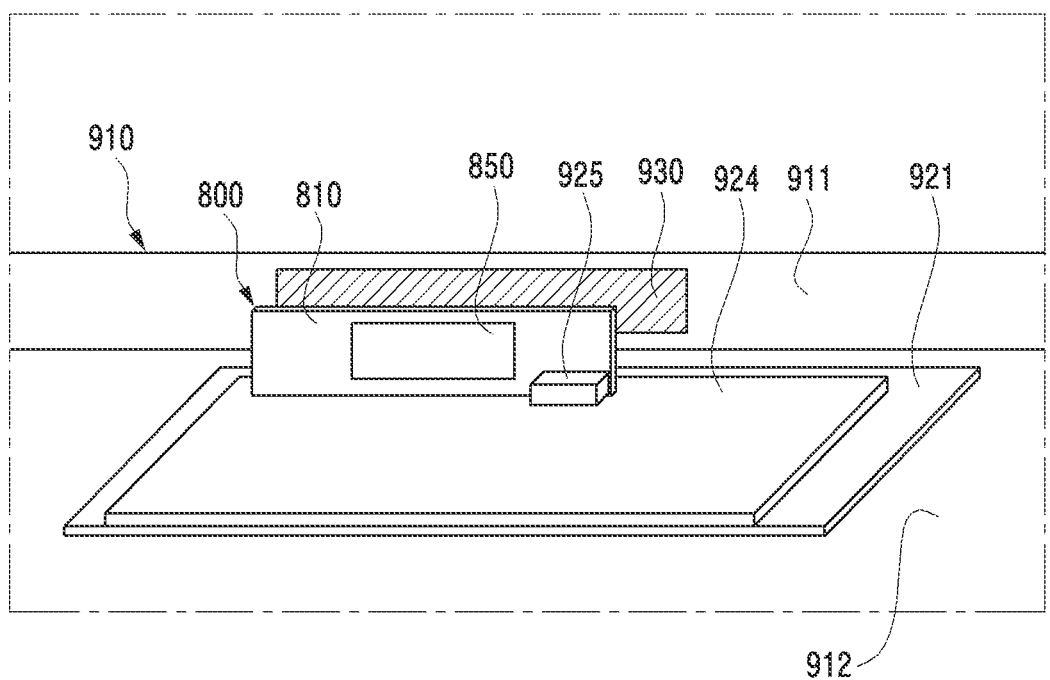
FIG. 12 illustrates a structure of disposing the communication device of FIG. 11 according to various embodiments.

FIG. 12 illustrates a structure of disposing the communication device of FIG. 11 according to various embodiments. Referring to FIG. 12, the communication device 800 may be disposed inside a housing 910 of the electronic device (e.g., the electronic device 200 of FIG. 2A). In an embodiment, the housing 910 (e.g., the housing 210 of FIG. 2A) may include a first plate (not shown) (e.g., the first face 210A of FIG. 2A), a second plate 912 (e.g., the second face 210B of FIG. 2A), and a side face 911 (e.g., the side face 210C of FIG. 2A) surrounding a space between the first plate and the second plate 912. A dielectric material 930 may be included in at least some regions of the side face 911. In an embodiment, a support member 921 (e.g., the first support member 2211 of FIG. 2C) disposed in parallel to the second plate 912 may be disposed inside the housing 910. A PCB 924 (e.g., the PCB 224 of FIG. 2C) may be disposed to the support member 921. According to an embodiment, the communication device 800 may be disposed to the PCB 924, so that the second face (e.g., the second face 812 of FIG. 11) faces the side face 911. The communication device 800 may be electrically coupled with the PCB 924 through a connector 925. The communication device 800 may form a beam having dual polarized waves orthogonal to each other through the first to fourth helical antennas 7001, 7002, 7003, and 7004, and the beam having the dual polarized waves may be radiated to the outside of the housing 910 through the dielectric material 930 constructed at a portion of the side face 911 of the housing 910.

According to various embodiments, an electronic device may include a housing (e.g., the housing 210 of FIG. 2A), an antenna structure (e.g., the antenna structure 501 of FIG. 4A) disposed inside the housing and including a first face (e.g., the first face 511 of FIG. 4A), a second face (e.g., the second face 512 of FIG. 4A) facing away from the first face (e.g., the first face 511 of FIG. 4A), a first conductive helical pattern (e.g., the first conductive helical pattern 430 of FIG. 4B) which extends between the first face (e.g., the first face 511 of FIG. 4A) and the second face (e.g., the second face 512 of FIG. 4A) and is constructed inside the antenna structure (e.g., the antenna structure 501 of FIG. 4A), and a second conductive helical pattern (e.g., the second conductive helical pattern 450) which extends between the first face (e.g., the first face 511 of FIG. 4A) and the second face (e.g., the second face 512 of FIG. 4A), overlaps with at least in part with the first conductive helical pattern (e.g., the first conductive helical pattern 430 of FIG. 4B) when viewed from above the first face (e.g., the first face 511 of FIG. 4A), and is constructed inside the antenna structure, and at least one wireless communication circuit (e.g., the wireless communication circuit 550 of FIG. 4A) electrically coupled to a first point (e.g., the first point A1 of FIG. 4C) of the first conductive helical pattern (e.g., the first conductive helical pattern 430 of FIG. 4B) and a second point (e.g., the second point A2 of FIG. 4C) of the second conductive helical pattern (e.g., the second conductive helical pattern 450 of FIG. 4B). When viewed from above the first face (e.g., the first face 511 of FIG. 4A), the first point (e.g., the first point A1 of FIG. 4C) may be disposed to be spaced apart from the second point (e.g., the second point A2 of FIG. 4C). The at least one wireless communication circuit (e.g., the wireless communication circuit 550 of FIG. 4A) may be configured to provide the first point (e.g., the first point A1 of FIG. 4C) with a first signal having a frequency between 3 GHz and 100 GHz, and provide the second point (e.g., the second point A2 of FIG. 4C) with a second signal having a first phase difference with the first signal and having the frequency.

According to various embodiments, when viewed from above the first face (e.g., the first face 511 of FIG. 4A), the first conductive helical pattern (e.g., the first conductive helical pattern 430 of FIG. 4A) and the second conductive helical pattern (e.g., the second conductive helical pattern 440 of FIG. 4B) may substantially have a circular shape together.

The first point (e.g., the first point A1 of FIG. 4C) and the second point (e.g., the second point A2 of FIG. 4C) may be disposed to be symmetrical to each other about a center of the circular shape.

The first phase difference may be 180 degrees.

According to various embodiments, the antenna structure (e.g., the antenna structure 501 of FIG. 4A) may include a third conductive antenna pattern (e.g., the third conducive helical pattern 450 of FIG. 4B) which extends between the first face (e.g., the first face 511 of FIG. 4A) and the second face (e.g., the second face 512 of FIG. 4A), overlaps at least in part with the first conductive helical pattern (e.g., the first conductive helical pattern 430 of FIG. 4B) and the second conductive helical pattern (e.g., the second conductive helical pattern 440 of FIG. 4B) when viewed from above the first face (e.g., the first face 511 of FIG. 4A), and is constructed inside the antenna structure (e.g., the antenna structure 501 of FIG. 4A), and a fourth conductive antenna pattern (e.g., the fourth conductive helical pattern 460 of FIG. 4B) which extends between the first face (e.g., the first face 511 of FIG. 4A) and the second face (e.g., the second face 512 of FIG. 4A), overlaps at least in part with the first conductive helical pattern (e.g., the first conductive helical pattern 430 of FIG. 4B) to the third conductive helical pattern (e.g., the third conductive helical pattern 450 of FIG. 4B) when viewed from above the first face (e.g., the first face 511 of FIG. 4A), and is constructed inside the antenna structure (e.g., the antenna structure 501 of FIG. 4A).

According to various embodiments, the communication circuit (e.g., the wireless communication module 192 of FIG. 1 or the wireless communication circuit 550 of FIG. 4A) may be electrically coupled to a third point (e.g., the third point A3 of FIG. 4C) of the third conductive helical pattern (e.g., the third conductive helical pattern 450 of FIG. 4B) and a fourth point (e.g., the fourth point A4 of FIG. 4C) of the fourth conductive helical pattern (e.g., the fourth conductive helical pattern 460 of FIG. 4B). The third point (e.g., the third point A3 of FIG. 4C) may be disposed to be spaced apart from each of the first point (e.g., the first point A1 of FIG. 4C) and the second point (e.g., the second point A2 of FIG. 4C) when viewed from above the first face (e.g., the first face 511 of FIG. 4A). The fourth point (e.g., the fourth point A4 of FIG. 4C) may be disposed to be spaced apart from each of the first point (e.g., the first point A1 of FIG. 4C) to the third point (e.g., the third point A3 of FIG. 4C) when viewed from above the first face (e.g., the first face 511 of FIG. 4A).

According to various embodiments, the communication circuit (e.g., the wireless communication circuit 550 of FIG. 4A) may be configured to provide the third point (e.g., the third point A3 of FIG. 4C) with a third signal which has a second phase difference with respect to the first signal and has the frequency, and provide the fourth point (e.g., the fourth point A4 of FIG. 4C) with a fourth signal having a third phase difference with respect to the first signal and has the frequency.

According to various embodiments, the antenna structure (e.g., the antenna structure 501 of FIG. 4A) may include a first insulation layer (e.g., the first insulation layer 531 of FIG. 4A), a second insulation layer stacked on the first insulation layer (e.g., the second insulation layer 532 of FIG. 4A), a first elongated conductive line (e.g., the first elongated conductive line 431 of FIG. 4B) disposed between the first insulation layer and the second insulation layer, including the first point (e.g., the first point A1 of FIG. 4C), and constituting a first portion of the first conductive helical pattern (e.g., the first conductive helical pattern 430 of FIG. 4B), and a second elongated conductive line (e.g., the second elongated conductive line 441 of FIG. 4B) disposed between the first insulation layer and the second insulation layer, disposed to be spaced apart from the first elongated conductive line, including the second point, and constituting a first portion of the second conductive helical pattern.

According to various embodiments, the antenna structure (e.g., the antenna structure 501 of FIG. 4A) may include a third insulation layer (e.g., the third insulation layer 533 of FIG. 4A) stacked on the second insulation layer (e.g., the second insulation layer 532 of FIG. 4A), a third elongated conductive line (e.g., the third elongated conductive line 432 of FIG. 4B) disposed between the second insulation layer and the third insulation layer and constructing a second portion of the first conductive helical pattern, a fourth elongated conductive line (e.g., the fourth elongated conductive line 442 of FIG. 4B) disposed between the second insulation layer and the third insulation layer, disposed to be spaced apart from the third line, and constructing a second portion of the second conductive helical pattern, a first conductive via electrically coupled between the first and third lines of the first conductive helical pattern, and a second conductive via electrically coupled between the second and fourth lines of the second conductive helical pattern.

According to various embodiments, an electronic device (e.g., the electronic device 101 of FIG. 1 or the electronic device 200 of FIG. 2A) may include a housing (e.g., the housing 210 of FIG. 2A), and an antenna structure (e.g., the antenna structure 501 of FIG. 4A) disposed inside the housing and including a first antenna element (e.g., the first antenna element 430 of FIG. 4B), a second antenna element (e.g., the second antenna element 440 of FIG. 4B), a third antenna element (e.g., the third antenna element 450 of FIG. 4B), and a fourth antenna element (e.g., the third antenna element 460 of FIG. 4B) which are disposed helically, an antenna structure including an insulation material (e.g., the insulation layer 530 of FIG. 4A) disposed between the first, second, third and fourth elements, and a wireless communication circuit (e.g., the wireless communication circuit 550 of FIG. 4A) electrically coupled to the first, second, third, and fourth antenna element and configured to transmit and/or receive a signal of 3 GHz to 100 GHz having different phases with respect to the first, second, third, and fourth antenna elements. The wireless communication circuit may be configured such that respective signals which are input to the first antenna element and the third antenna element have a first phase difference, and respective signals which are input to the second antenna element and the fourth antenna element have a second phase difference.

According to various embodiments, the first to fourth antenna elements (e.g., the first to fourth antenna elements 430, 440, 450, and 460 of FIG. 4B) may respectively include a first elongated conductive line (e.g., the first elongated conductive line 431 of FIG. 4B) disposed to a first insulation layer (e.g., the first insulation layer 531 of FIG. 4A) among the plurality of insulation layers (e.g., the plurality of insulation layer 530 of FIG. 4A), and a second elongated conductive line (e.g., the second elongated conductive line 432 of FIG. 4B) disposed to the second insulation layer stacked on the first insulation layer. The first elongated conductive line and second elongated conductive line of the first to fourth antenna elements are electrically coupled by means of a first conductive via (e.g., the conductive via 437a of FIG. 4B) which penetrates the first insulation layer and the second insulation layer in a stacking direction.

According to various embodiments, an end portion of the second elongated conductive line (e.g., the second elongated conductive line 432 of FIG. 4B) of the first antenna element (e.g., the first antenna element 430 of FIG. 4B) and an end portion of the second elongated conductive line (e.g., the second elongated conductive line 452 of FIG. 4B) of the third antenna element (e.g., the third antenna element 450 of FIG. 4B) may be disposed to face each other about a helical central axis. An end portion of the second elongated conductive line (e.g., the second elongated conductive line 442 of FIG. 4B) of the second antenna element (e.g., the second antenna element 440 of FIG. 4B) and an end portion of the second elongated conductive line (e.g., the second elongated conductive line 462 of FIG. 4B) of the fourth antenna element (e.g., the fourth antenna element 460 of FIG. 4B) may be disposed to face each other about the helical central axis.

According to various embodiments, the wireless communication circuit (e.g., the wireless communication circuit 600 of FIG. 5) may be configured to provide a first signal through a first point (e.g., the first point A1 of FIG. 4C) of the first antenna element (e.g., the first antenna element 430 of FIG. 4B) and provide a third signal through a third point (e.g., the third point A3 of FIG. 4C) of the third antenna element (e.g., the third antenna element 450 of FIG. 4B), so that the first phase difference between an input phase of the first signal and an input phase of the third signal is set to 180 degrees, and to provide a second signal through a second point (e.g., the second point A2 of FIG. 4C) of the second antenna element (e.g., the second antenna element 440 of FIG. 4B) and provide a fourth signal through a fourth point (e.g., the fourth point A4 of FIG. 4C) of the fourth antenna element (e.g., the fourth antenna element 460 of FIG. 4B), so that the second phase difference between an input phase of the second signal and an input phase of the fourth signal is set to 180 degrees.

According to various embodiments, the first point (e.g., the first point A1 of FIG. 4C) and the third point (e.g., the third point A3 of FIG. 4C) may be disposed to face each other about the helical central axis. The second point (e.g., the second point A2 of FIG. 4C) and the fourth point (e.g., the fourth point A4 of FIG. 4C) may be disposed to face each other about the helical central axis.

According to various embodiments, a first polarized wave may be radiated by means of the first antenna element (e.g., the first antenna element 430 of FIG. 4B) and the third antenna element (e.g., the third antenna element 450 of FIG. 4B). A second polarized wave may be radiated by means of the second antenna element (e.g., the second antenna element 440 of FIG. 4B) and the fourth antenna element (e.g., the fourth antenna element 460 of FIG. 4B). The first polarized wave and the second polarized wave may include polarized waves aligned in different directions.

The first polarized wave and the second polarized wave may be orthogonal to each other.

According to various embodiments, the electronic device may further include at least one or more third insulation layers (e.g., the third insulation layers 533 to 536 of FIG. 4A) stacked sequentially on the second insulation layer (e.g., the second insulation layer 532 of FIG. 4A). Each of the first to fourth antenna elements (e.g., the first to fourth antenna elements 430, 440, 450, and 450 of FIG. 4B) may further include at least one or more third elongated conductive lines (e.g., the third elongated conductive lines 433 to 436 of FIG. 4A) disposed respectively to the at least one or more third insulation layers, and at least one or more second conductive vias (e.g., 437b to 437e) respectively penetrating the at least one or more third insulation layers so that the at least one or more third elongated conductive lines are electrically coupled to each other.

According to various embodiments, the first elongated conductive line (e.g., the first elongated conductive line 431 of FIG. 4A) and second elongated conductive line (e.g., the second elongated conductive line 432 of FIG. 4A) of the first to fourth antenna elements (e.g., the first to fourth antenna elements 430, 440, 450, and 460 of FIG. 4B) may be constructed to have an angle less than a specific rotation angle about the helical central axis.

Various embodiments of the disclosure disclosed in the specification and the drawing are merely a specific example presented for clarity and are not intended to limit the scope of the embodiments of the disclosure. Therefore, in addition to the embodiments disclosed herein, various changes in forms and details made without departing from the technical concept of the various embodiments of the disclosure will be construed as being included in the scope of the various embodiments of the disclosure.

The invention claimed is:

1. An electronic device comprising:
   a housing;
   an antenna structure disposed inside the housing and including a first face, a second face facing away from the first face, a first conductive helical pattern which extends between the first face and the second face and is constructed inside the antenna structure, and a second conductive helical pattern which extends between the first face and the second face, overlaps with at least in part with the first conductive helical pattern when viewed from above the first face, and is constructed inside the antenna structure; and at least one wireless communication circuit electrically coupled to a first point of the first conductive helical pattern and a second point of the second conductive helical pattern, wherein the first point is disposed to be spaced apart from the second point when viewed from above the first face, and wherein the at least one wireless communication circuit is configured to:
provide the first point with a first signal having a frequency between 3 GHz and 100 GHz; and
provide the second point with a second signal having a first phase difference with the first signal and having the frequency.

2. The electronic device of claim 1,
wherein the first conductive helical pattern and the second conductive helical pattern substantially have a circular shape together when viewed from above the first face, and the first point and the second point are disposed to be symmetrical to each other about a center of the circular shape when viewed from above the first face, and
wherein the first phase difference is 180 degrees.

3. The electronic device of claim 1, wherein the antenna structure comprises:
a third conductive antenna pattern which extends between the first face and the second face, overlaps at least in part with the first conductive helical pattern and the second conductive helical pattern when viewed from above the first face, and is constructed inside the antenna structure; and
a fourth conductive antenna pattern which extends between the first face and the second face, overlaps at least in part with the first conductive helical pattern to a third conductive helical pattern when viewed from above the first face, and is constructed inside the antenna structure.

4. The electronic device of claim 3, wherein the wireless communication circuit is electrically coupled to a third point of the third conductive helical pattern and a fourth point of a fourth conductive helical pattern, the third point is disposed to be spaced apart from each of the first point and the second point when viewed from above the first face, and the fourth point is disposed to be spaced apart from each of the first point to the third point when viewed from above the first face.

5. The electronic device of claim 4, wherein the wireless communication circuit is configured to provide the third point with a third signal which has a second phase difference with respect to the first signal and has the frequency, and provide the fourth point with a fourth signal having a third phase difference with respect to the first signal and has the frequency.

6. The electronic device of claim 1, wherein the antenna structure comprises:
a first insulation layer;
a second insulation layer stacked on the first insulation layer;
a first elongated conductive line disposed between the first insulation layer and the second insulation layer, including the first point, and constituting a first portion of the first conductive helical pattern; and
a second elongated conductive line disposed between the first insulation layer and the second insulation layer, disposed to be spaced apart from the first elongated conductive line, including the second point, and constituting a first portion of the second conductive helical pattern.

7. The electronic device of claim 6, wherein the antenna structure comprises:
a third insulation layer stacked on the second insulation layer;
a third elongated conductive line disposed between the second insulation layer and the third insulation layer and constructing a second portion of the first conductive helical pattern;
a fourth elongated conductive line disposed between the second insulation layer and the third insulation layer, disposed to be spaced apart from the third elongated conductive line, and constructing a second portion of the second conductive helical pattern;
a first conductive via electrically coupled between the first and third elongated conductive lines of the first conductive helical pattern; and
a second conductive via electrically coupled between the second and fourth elongated conductive lines of the second conductive helical pattern.

8. An electronic device comprising:
a housing; and
an antenna structure disposed inside the housing and including a first antenna element, a second antenna element, a third antenna element, and a fourth antenna element which are disposed helically;
an antenna structure including an insulation material disposed between the first, second, third and fourth elements; and
a wireless communication circuit electrically coupled to the first, second, third, and fourth antenna element and configured to transmit and/or receive a signal of 3 GHz to 100 GHz having different phases with respect to the first, second, third, and fourth antenna elements,
wherein the wireless communication circuit is configured such that respective signals which are input to the first antenna element and the third antenna element have a first phase difference, and respective signals which are input to the second antenna element and the fourth antenna element have a second phase difference.

9. The electronic device of claim 8, wherein the first to fourth antenna elements comprise a first elongated conductive line disposed to a first insulation layer among a plurality of insulation layers, and a second elongated conductive line disposed to a second insulation layer stacked on the first insulation layer, and the first elongated conductive line and second elongated conductive line of the first to fourth antenna elements are electrically coupled by means of a first conductive via which penetrates the first insulation layer and the second insulation layer in a stacking direction.

10. The electronic device of claim 9,
wherein an end portion of the second elongated conductive line of the first antenna element and an end portion of the second elongated conductive line of the third antenna element are disposed to face each other about a helical central axis, and
wherein an end portion of the second elongated conductive line of the second antenna element and an end portion of the second elongated conductive line of the fourth antenna element are disposed to face each other about the helical central axis.

11. The electronic device of claim 8, wherein the wireless communication circuit is configured to provide a first signal through a first point of the first antenna element, and provide a third signal through a third point of the third antenna element, so that the first phase difference between an input phase of the first signal and an input phase of the third signal is set to 180 degrees, and provide a second signal through a second point of the second antenna element, and provide a fourth signal through a fourth point of the fourth antenna element, so that the second phase difference between an input phase of the second signal and an input phase of the fourth signal is set to 180 degrees.

12. The electronic device of claim 11, wherein the first point and the third point are disposed to face each other about a helical central axis, and the second point and the fourth point are disposed to face each other about the helical central axis.

13. The electronic device of claim 8, wherein a first polarized wave is radiated by means of the first antenna element and the third antenna element, a second polarized wave is radiated by means of the second antenna element and the fourth antenna element, and the first polarized wave and the second polarized wave include polarized waves aligned in different directions, and the first polarized wave and the second polarized wave are orthogonal to each other.

14. The electronic device of claim 9, further comprising at least one or more third insulation layers stacked sequentially on the second insulation layer,
wherein each of the first to fourth antenna elements further includes:
 a layer;
 at least one or more third elongated conductive lines disposed respectively to the at least one or more third insulation layers; and
 at least one or more second conductive vias respectively penetrating the at least one or more third insulation layers so that the at least one or more third elongated conductive lines are electrically coupled to each other.

15. The electronic device of claim 9, wherein the first elongated conductive line and second elongated conductive line of each of the first to fourth antenna elements are constructed to have an angle less than a specific rotation angle about a helical central axis.

\* \* \* \* \*